(12) United States Patent
Sakamoto

(10) Patent No.: US 8,253,362 B2
(45) Date of Patent: Aug. 28, 2012

(54) OVERHEAT PROTECTION APPARATUS

(75) Inventor: Tomokazu Sakamoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 12/902,645

(22) Filed: Oct. 12, 2010

(65) Prior Publication Data

US 2011/0101904 A1 May 5, 2011

(30) Foreign Application Priority Data

Nov. 5, 2009 (JP) ................................. 2009-253965

(51) Int. Cl.
*H02H 7/08* (2006.01)
*B62D 5/04* (2006.01)
(52) U.S. Cl. ............. 318/434; 318/473; 701/41; 361/24
(58) Field of Classification Search .......... 318/432–434, 318/471–473; 388/934; 361/23–25, 31; 701/41–43
See application file for complete search history.

(56) References Cited

U.S. PATENT DOCUMENTS

| | | | | |
|---|---|---|---|---|
| 4,301,396 A * | 11/1981 | Bourke | ......................... | 318/490 |
| 4,394,607 A * | 7/1983 | Lemirande | .................... | 318/453 |
| 4,430,681 A * | 2/1984 | Benzing | ......................... | 361/27 |
| 4,771,843 A * | 9/1988 | Shimizu | ......................... | 180/446 |
| 5,936,820 A * | 8/1999 | Umemura et al. | ............ | 361/103 |
| 6,902,028 B2 * | 6/2005 | Takatsuka et al. | ............ | 180/446 |
| 7,091,686 B2 * | 8/2006 | Kagei | ............................ | 318/434 |
| 7,164,248 B2 * | 1/2007 | Hayashi | ........................ | 318/434 |
| 7,203,583 B2 * | 4/2007 | Fujimoto et al. | ................ | 701/41 |
| 7,619,859 B2 * | 11/2009 | Zeniya et al. | .................... | 361/25 |
| 7,623,327 B2 * | 11/2009 | Ogawa | ............................ | 361/25 |
| 7,642,738 B2 * | 1/2010 | Hamada et al. | ............... | 318/434 |
| 7,791,296 B2 * | 9/2010 | Ogawa | .......................... | 318/434 |
| 8,079,602 B2 * | 12/2011 | Kinsman et al. | ........... | 280/5.512 |
| 8,122,993 B2 * | 2/2012 | Ripley et al. | .................. | 180/233 |
| 2004/0026161 A1 * | 2/2004 | Takatsuka et al. | ............ | 180/446 |
| 2005/0257986 A1 * | 11/2005 | Kagei | ............................ | 180/404 |
| 2009/0259419 A1 * | 10/2009 | Kasai | .............................. | 702/63 |
| 2011/0178681 A1 * | 7/2011 | Gu | .................................. | 701/42 |

FOREIGN PATENT DOCUMENTS

| JP | 04021304 A | * | 1/1992 |
|---|---|---|---|
| JP | 2008-054440 A | | 3/2008 |

* cited by examiner

*Primary Examiner* — Eduardo Colon Santana

(74) *Attorney, Agent, or Firm* — Squire Sanders (US) LLP

(57) ABSTRACT

An apparatus which estimates the temperatures of a motor without using a temperature sensor can achieve overheat protection by proper control. In an example, a heat generation amount calculation section calculates a heat generation amount of a motor. A current upper limit map has a current upper limit value corresponding to a temperature estimated value and a ratio map has a ratio corresponding to the temperature estimated value. A lower one of limited current values, determined using the two maps, controls energization of the motor. The heat generation amount calculation section includes a heat generation correction term, and a heat radiation correction term for calculating a function of the difference between the integrated value of the heat generation amount and a motor ambient temperature. If the ambient temperature becomes equal to or higher than a comparison temperature, then the heat generation amount is calculated without the heat radiation correction present.

13 Claims, 21 Drawing Sheets

OVERHEAT PROTECTION APPARATUS

CROSS REFERENCE TO RELATED APPLICATIONS

This application is related to and claims the priority of JP 2009-253965 filed Nov. 5, 2009. JP 2009-253965 is incorporated by reference in its entirety herein.

BACKGROUND

1. Field

Embodiments of the present invention relate, for example, to an overheat protection apparatus, and particularly to an overheat protection apparatus which limits current to a motor in accordance with a motor temperature estimated from a heat generation amount by energization current to protect the motor and motor peripheral apparatus from overheating.

2. Description of the Related Art

Electric power steering systems, wherein pivotal assisting force is applied from an electric motor to a steering shaft to reduce the steering force, are sometimes provided in an apparatus that includes a steering shaft that is rotated by a bar handle, a steering wheel or the like to steer a vehicle.

Japanese Patent Laid-Open No. 2008-54440 discloses a controlling apparatus for an electric power steering apparatus which estimates a winding temperature of an electric motor and carries out temperature protection control of the motor based on the estimated temperature.

Generally, where the winding temperature of a motor is estimated, a value I of current flowing through the winding and a resistance value R of the winding are utilized in accordance with the Joule's law. In particular, the heat generation amount Q accumulated within energization time t is calculated in accordance with the following:

$$Q = I^2 \times R \times t \qquad \text{(expression 1)}.$$

Although the heat generation amount Q with which a temperature can be estimated is calculated in accordance with this expression 1, in order to estimate the temperature with a higher degree of accuracy, also the heat radiation amount can be taken into consideration. The expression 2 given below is an estimation expression for calculating a cumulative value T of the heat mount including a constant a as a heat radiation amount correction term.

$$\text{Cumulative value } T = \Sigma(K \cdot I^2 - a) \qquad \text{(expression 2)}.$$

According to this expression 2, the heat generation amount when the power steering apparatus operates to energize the electric motor is integrated for the energization time period to estimate the temperature, and the constant a is subtracted as a heat radiation amount. The constant a in the expression 2 is set to a very low value so that, in order to estimate the temperature to a rather high value to ensure the temperature protection, the cumulative value T may return to zero in a period of time longer than the time period in which the temperature returns from the highest temperature to the room temperature when the energization is stopped at the highest temperature of the winding. This is because, if the constant a is excessively high, then the inclination that the cumulative value T becomes low becomes noticeable and the winding temperature is likely to be estimated lower. Where the energization is not carried out for a long period of time, the cumulative value T returns to zero with the constant a. It is to be noted that, in the expression 2, the coefficient K is an integration coefficient and is determined in advance by an experiment so that the calculated value may approach an actually measured value.

SUMMARY

According to certain embodiments, an apparatus is provided. The apparatus includes a motor controller configured to control supply current to a motor within a predetermined upper limit value. The apparatus also includes a heat generation amount calculation section configured to calculate a heat generation amount of the motor based on the supply current. The apparatus further includes an integration section configured to integrate the heat generation amount to obtain an integrated temperature. The apparatus additionally includes an addition section configured to add an initial temperature to the integrated temperature to calculate a temperature estimated value. The apparatus also includes a current upper limit map having a current upper limit value set therein corresponding to the temperature estimated value. The apparatus further includes a ratio map having a current limitation ratio of the motor set therein corresponding to the temperature estimated value. The apparatus additionally includes a selection section configured to select a lower one of limited current values determined using the current upper limit map and the ratio map to limit energization to the motor. The heat generation amount calculation section is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient. The heat generation amount calculation section is configured such that, in a first case wherein the motor ambient temperature is equal to or higher than a first comparison temperature set in advance, the heat generation amount is calculated with a calculation expression equivalent to the heat generation amount calculation expression from which the heat radiation correction term is deleted so that the limitation to energization of the motor may be increased.

An overheat protection apparatus, for use with an apparatus which includes a motor, and a motor controller for controlling supply current to the motor within a predetermined upper limit value, is provided in certain embodiments. The overheat protection apparatus includes a heat generation amount calculation section configured to calculate a heat generation amount of the motor based on the supply current. The overheat protection apparatus also includes an integration section configured to integrate the heat generation amount to obtain an integrated temperature. The overheat protection apparatus further includes an addition section configured to add an initial temperature to the integrated temperature to calculate a temperature estimated value. The overheat protection apparatus additionally includes a current upper limit map having a current upper limit value set therein corresponding to the temperature estimated value. The overheat protection apparatus also includes a ratio map having a current limitation ratio of the motor set therein corresponding to the temperature estimated value. The overheat protection apparatus further includes a selection section configured to select a lower one of limitation current values determined using the current upper limit map and the ratio map to limit energization of the motor. The heat generation amount calculation section is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient. The heat generation amount calculation section is configured such that, when the temperature estimated value is equal to or higher than a third comparison temperature set in advance, the heat generation amount is calculated with a calculation expression equivalent to the heat generation amount calculation expression from which the heat radiation correction term is deleted.

Certain embodiments provide an apparatus that includes control means for controlling supply current to a motor within a predetermined upper limit value. The apparatus also includes heat generation amount calculation means for calculating a heat generation amount of the motor based on the supply current. The apparatus further includes integration means for integrating the heat generation amount to obtain an integrated temperature. The apparatus additionally includes addition means for adding an initial temperature to the integrated temperature to calculate a temperature estimated value. The apparatus also includes a current upper limit map having a current upper limit value set therein corresponding to the temperature estimated value. The apparatus further includes a ratio map having a current limitation ratio of the motor set therein corresponding to the temperature estimated value. The apparatus additionally includes selection means for selecting a lower one of limited current values determined using the current upper limit map and the ratio map to limit energization to the motor. The heat generation amount calculation means is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient. The heat generation amount calculation means is configured such that, in a first case wherein the motor ambient temperature is equal to or higher than a first comparison temperature set in advance, the heat generation amount is calculated with a calculation expression equivalent to the heat generation amount calculation expression from which the heat radiation correction term is deleted so that the limitation to energization of the motor may be increased.

Certain embodiments provide an overheat protection apparatus for use with an apparatus which includes a motor, and control means for controlling supply current to the motor within a predetermined upper limit value. The overheat protection apparatus includes heat generation amount calculation means for calculating a heat generation amount of the motor based on the supply current. The overheat protection apparatus also includes integration means for integrating the heat generation amount to obtain an integrated temperature. The overheat protection apparatus further includes addition means for adding an initial temperature to the integrated temperature to calculate a temperature estimated value. The overheat protection apparatus additionally includes a current upper limit map having a current upper limit value set therein corresponding to the temperature estimated value. The overheat protection apparatus also includes a ratio map having a current limitation ratio of the motor set therein corresponding to the temperature estimated value. The overheat protection apparatus further includes selection means for selecting a lower one of limitation current values determined using the current upper limit map and the ratio map to limit energization of the motor. The heat generation amount calculation means is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient. The heat generation amount calculation means is configured such that, when the temperature estimated value is equal to or higher than a third comparison temperature set in advance, the heat generation amount is calculated with a calculation expression equivalent to the heat generation amount calculation expression from which the heat radiation correction term is deleted.

A method according to certain embodiments includes controlling supply current to a motor within a predetermined upper limit value. The method also includes calculating a heat generation amount of the motor based on the supply current. The method further includes integrating the heat generation amount to obtain an integrated temperature. The method additionally includes adding an initial temperature to the integrated temperature to calculate a temperature estimated value. The method also includes providing, in a current upper limit map, a current upper limit value corresponding to the temperature estimated value. The method further includes providing, in a ratio map, a current limitation ratio of the motor corresponding to the temperature estimated value. The method additionally includes selecting a lower one of limited current values determined using the current upper limit map and the ratio map to limit energization to the motor. The calculating the heat generation amount includes using a heat generation amount calculation expression that includes a heat generation correction term and a heat radiation correction term for calculating, as a subtraction term, a value by multiplying the difference between the integrated temperature and a motor ambient temperature by a heat radiation coefficient. The calculating the heat generation amount is performed such that, in a first case wherein the motor ambient temperature is equal to or higher than a first comparison temperature set in advance, the heat generation amount is calculated with a calculation expression equivalent to the heat generation amount calculation expression from which the heat radiation correction term is deleted so that the limitation to energization of the motor may be increased.

In certain embodiments a method is provided for use with an apparatus which includes a motor, and a controller configured to control supply current to the motor within a predetermined upper limit value. The method includes calculating a heat generation amount of the motor based on the supply current. The method also includes integrating the heat generation amount to obtain an integrated temperature. The method further includes adding an initial temperature to the integrated temperature to calculate a temperature estimated value. The method additionally includes providing, in a current upper limit map, a current upper limit value corresponding to the temperature estimated value. The method also includes providing, in a ratio map, a current limitation ratio of the motor corresponding to the temperature estimated value. The further includes selecting a lower one of limitation current values determined using the current upper limit map and the ratio map to limit energization of the motor. The calculating the heat generation amount includes using a heat generation amount calculation expression that includes a heat generation correction term and a heat radiation correction term for calculating, as a subtraction term, a value by multiplying the difference between the integrated temperature and a motor ambient temperature by a heat radiation coefficient. The calculating the heat generation amount is performed such that, when the temperature estimated value is equal to or higher than a third comparison temperature set in advance, the heat generation amount is calculated with a calculation expression equivalent to the heat generation amount calculation expression from which the heat radiation correction term is deleted.

BRIEF DESCRIPTION OF THE DRAWINGS

For proper understanding of the invention, reference should be made to the accompanying drawings, wherein.

DETAILED DESCRIPTION

Figure 1:
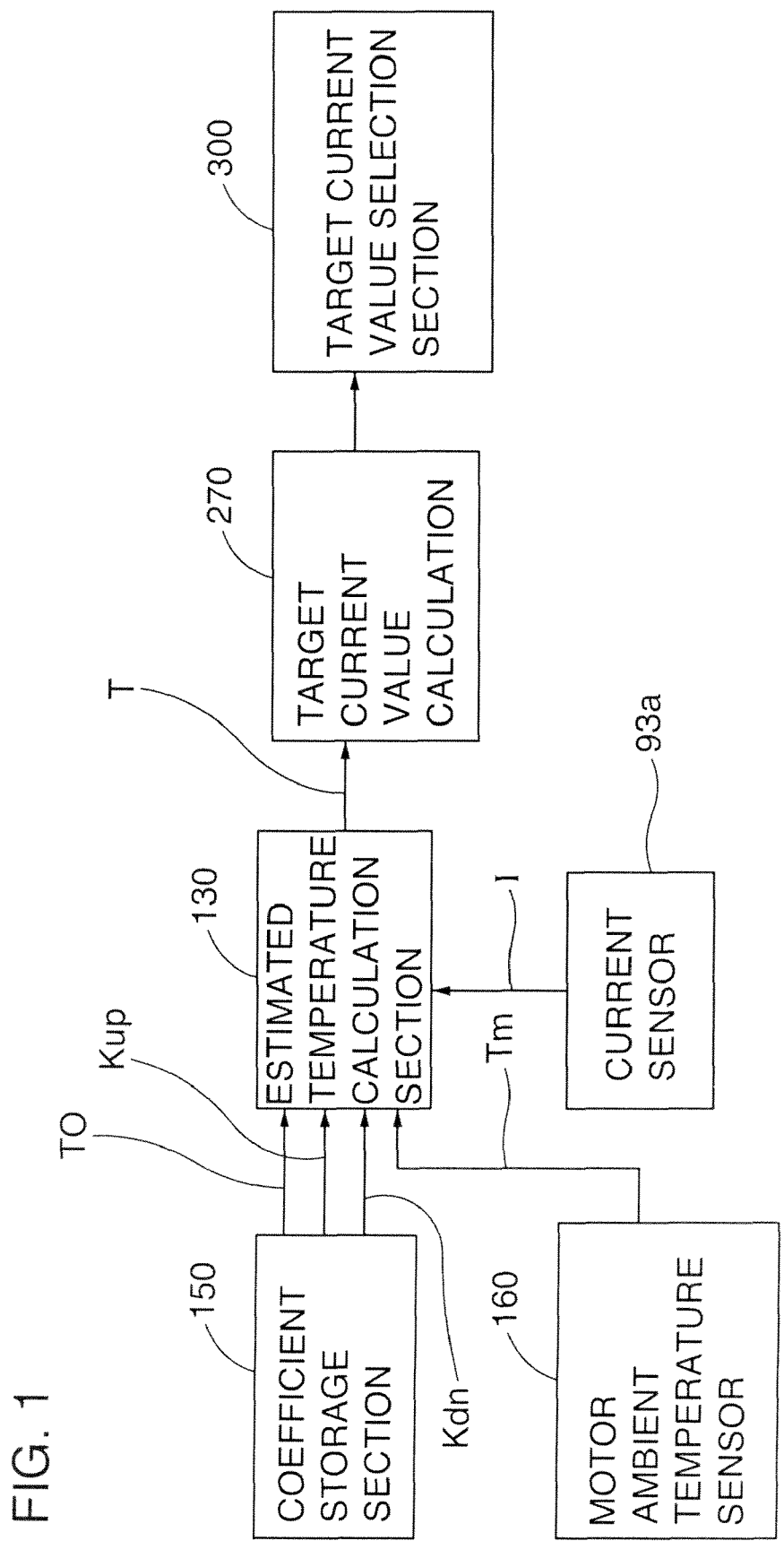
FIG. 1 is a block diagram showing a detailed configuration of a target current limitation section in an electric power steering controlling apparatus according to an embodiment of the present invention.

If the formula provided in expression 2 (given above) is used, then the temperature of the electric motor can be estimated without using a temperature sensor, and if the estimated temperature becomes higher than a temperature set in advance, then protection of the electric motor is achieved by reducing or stopping the current supply to the electric motor.

Here, in an electronic power steering apparatus, the heat generating source by energization is not limited to the motor (winding and brush of the motor) but also extends to a motor controller for controlling the motor (particularly electronic parts such as field effect transistors and so forth) and peripheral apparatus, and therefore, all of those elements may be protectable through overheat protection. If all of a plurality of elements or parts (hereinafter referred to collectively as "parts") are determined to be protected from overheating, then it may be helpful to take the heat generation and heat radiation characteristics of those parts into consideration. In particular, since the heat capacity differs among different parts, such parts as a field effect transistor (FET) and a motor brush which have a small heat mass generate heat quickly and radiate heat quickly, but such parts as a relay and a capacitor which have a great heat mass generate heat slowly and radiate heat slowly.

Therefore, the estimated temperature can be determined so that it may not become lower than all actual part temperatures taking the heat generation and heat radiation characteristics which depend upon such differences in heat capacity into consideration. In other words, the estimated temperature upon heat generation may rise earlier than the temperature rise of all parts but upon heat radiation drops more slowly than the temperature drop of all parts.

Therefore, it may be valuable to determine the estimated temperature appropriately taking it into consideration that the heat capacities of different parts are different from each other.

Certain embodiments of the present invention provide an overheat protection apparatus which can achieve overheat protection by efficiently changing over calculation of the heat generation amount from the ambient temperature of a motor in response to the heat generation characteristic of parts whose heat masses are different from each other in order to prevent the motor and peripheral apparatus to the motor from overheating.

More particularly, advantages of certain embodiments of the present invention reside in provision of an overheat protection apparatus which can achieve overheat protection of a motor by estimating the temperature of the motor efficiently taking the influence of the heat radiation amount, which varies depending upon the difference between the temperature of the motor and the ambient temperature, into consideration.

In order to address the issues described above, according to the present invention, an overheat protection apparatus which includes a motor and a motor controller for controlling supply current to the motor within a predetermined upper limit value, a heat generation amount calculation section for calculating a heat generation amount of the motor based on the supply current, an integration section for integrating the heat generation amount to obtain an integrated temperature, an addition section for adding an initial temperature to the integrated temperature to calculate a temperature estimated value, a current upper limit map having a current upper limit value set therein corresponding to the temperature estimated value, a ratio map having a current limitation ratio of the motor set therein corresponding to the temperature estimated value, and a selection section for selecting a lower one of limited current values determined using the current upper limit map and the ratio map to limit energization to the motor, has a first characteristic in that the heat generation amount calculation section includes a heat generation amount calculation expression which in turn includes a heat generation correction term and a heat radiation correction term for calculating, as a subtraction term, a value by multiplying the difference between the integrated temperature and a motor ambient temperature by a heat radiation coefficient, and is configured such that, in a first case wherein the motor ambient temperature is equal to or higher than a first comparison temperature set in advance, the heat generation amount is calculated with a calculation expression equivalent to the heat generation amount calculation expression from which the heat radiation correction term is deleted so that the limitation to energization of the motor may be increased.

According to embodiments of the present invention having the first characteristic, where the motor is driven for a long period of time and the motor ambient temperature which is a temperature estimated value of the motor controller or the motor is higher than the set comparison temperature, this is a state wherein a relay, a capacitor or the like having a great heat mass is generating heat. Thus, by calculating the heat generation amount to a rather high value than an actual value using the calculation expression from which the heat radiation correction term is deleted, the map is searched in accordance with the comparatively high temperature estimated value to determine a current limitation value.

In this manner, according to certain embodiments of the present invention, paying attention to the fact that, when the ambient temperature of the motor is high, a part having a great heat mass is generating heat, the heat generation amount is calculated only from the energization current of the motor to determine the limited current. Therefore, the energization current of the motor can be reduced rather early.

Accordingly, efficient overheat protection of the motor and the motor controller taking the difference in heat generation amount depending upon the magnitude of the heat mass into consideration can be carried out only by changeover of a heat generation calculation expression to be used by the heat generation calculation section. Thus, since a plurality of heat generation amount calculation sections are not provided, a program for the overheat protection process can be simplified.

Further, according to certain embodiments of the present invention, the overheat protection apparatus has a second characteristic in that the heat generation amount calculation section is configured such that, also in a second case wherein the motor ambient temperature is lower than the comparison temperature and the temperature estimated value is equal to or higher than a second comparison temperature set in advance, the heat generation amount is calculated with the calculation expression equivalent to the heat generation amount calculation expression from which the heat radiation correction term is deleted, and a heat generation coefficient of the heat generation correction term of the calculation expression used in the second case is set to a value higher than that of a heat generation coefficient of the calculation expression used in the first case.

According to certain embodiments of the present invention having the second characteristic, where the temperature estimated value of the motor having a small heat capacity is higher than the comparison temperature, the temperature of the motor reaches an upper limit of the heatproof temperature in a shorter period of time than the motor controller which has a great heat capacity. Therefore, the heat generation coefficient is set to a high value so that the calculation value of the heat generation amount may become rather high. Therefore, overheat protection can be carried out more precisely.

Further, according to certain embodiments of the present invention, an overheat protection apparatus has a third characteristic in that that it includes a heat generation amount calculation section, an integration section, an addition section, a current upper limit map, a ratio map, and a selection section for selecting a lower one of limitation current values determined using the current upper limit map and the ratio map to limit energization of the motor similarly to the embodiments of the present invention having the first characteristic, and that the heat generation amount calculation section includes a heat generation amount calculation expression which in turn includes a heat generation correction term and a heat radiation correction term for calculating, as a subtraction term, a value by multiplying the difference between the integrated temperature and a motor ambient temperature by a heat radiation coefficient, and is configured such that, when the temperature estimated value is equal to or higher than a third comparison temperature set in advance, the heat generation amount is calculated with a calculation expression equivalent to the heat generation amount calculation expression from which the heat radiation correction term is deleted.

According to certain embodiments of the present invention having the third characteristic, where the current upper limit map is selected to carry out current limitation, when the temperature estimated value is higher than the comparison temperature, correction is carried out so that the heat generation amount may become rather high than the actual value. Therefore, current limitation can be carried out such that the temperature estimated value and the current value may not enter an equilibrium state.

Further, according to various embodiments of the present invention, the overheat protection apparatus has a fourth characteristic in that the motor is a power assisting motor for power steering for a vehicle for traveling on uneven ground.

According to embodiments of the present invention having the fourth characteristic, the motor and the motor controller in a vehicle for traveling on uneven ground on which it is estimated that a power steering system is used frequently can be protected.

Figure 2:
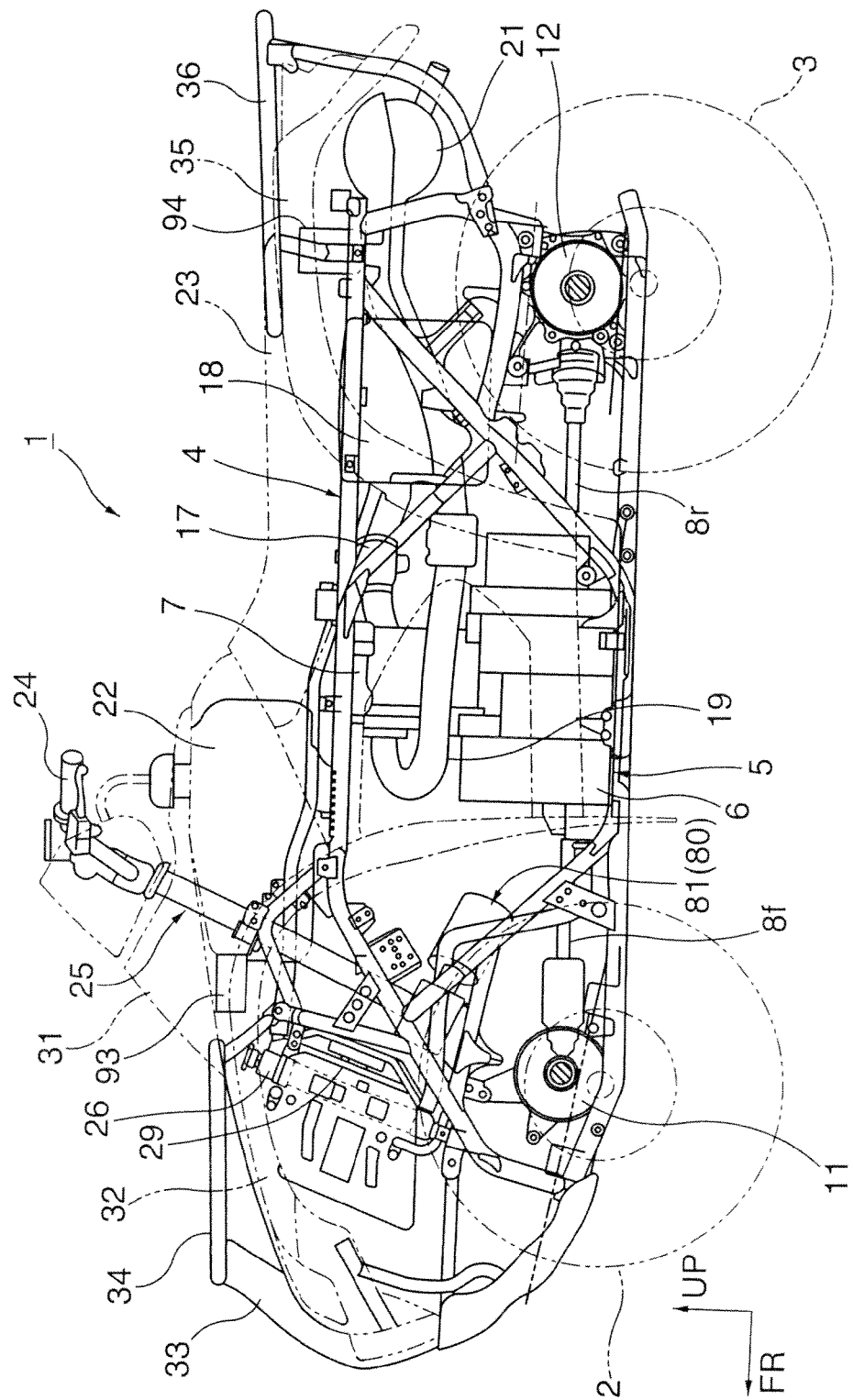
FIG. 2 is a left side elevational view of a saddle type vehicle in which the electric power steering controlling apparatus of the present invention is incorporated.

In the following, embodiments of the present invention are described with reference to the drawings. FIG. 2 is a left side elevational view of a saddle type vehicle which incorporates an electric power steering apparatus with an overheat protection apparatus according to an embodiment of the present invention. The saddle type vehicle (hereinafter referred to simply as "vehicle") 1 is an ATV (All Terrain Vehicle) include front wheels 2 and rear wheels 3, which are low-pressure balloon tires of a comparatively large diameter, provided on the left and the right of a vehicle body formed in a small size with a light weight, and can be configured for improved traveling performance on uneven ground.

An engine 5 as a prime mover is mounted at a central portion of a vehicle body frame 4. The engine 5 is a water-cooled single-cylinder engine and is disposed with an output power shaft thereof directed in the forward and backward direction of the vehicle 1. A propeller shaft 8f extending forwardly from a lower portion of the engine 5 is connected for power transmission to the front wheels 2 through a front reduction gear mechanism 11 on the lower side of a front portion of the vehicle body frame 4. Similarly, a propeller shaft 8r is connected for power transmission to the rear wheels 3 through a rear reduction gear mechanism 12 on the lower side of a rear portion of the vehicle body frame 4.

On the engine 5, a throttle body 17 is connected to a rear portion of a cylinder section 7 provided uprightly on a crankcase 6, and an air cleaner 18 is connected to a rear portion of the throttle body 17. An exhaust pipe 19 is connected to the cylinder section 7, and is connected at an end portion thereof to a silencer 21 at a rear portion of the vehicle body.

A fuel tank 22 is provided at a front portion of the center in the vehicle widthwise direction of an upper portion of the vehicle body of the vehicle 1, and a seat 23 is disposed rearwardly of the fuel tank 22. A battery 94 is disposed lower rearward part of the seat 23. A rearwardly recessed concave portion (not shown) is formed at a front portion of the fuel tank 22 in order to allow a steering shaft 25 to extend upwardly and downwardly. A bar-type steering handle member (hereinafter referred to simply as handle bar) 24 is secured to an upper end portion of the steering shaft 25. A radiator 26 for engine cooling is disposed forwardly of a lower portion of the steering shaft 25, and a radiator fan 29 is provided rearwardly of the radiator 26.

To a front portion of the vehicle body frame 4, a vehicle body cover 31 for covering a front portion of the vehicle body, a front fender 32 for covering over the front wheels 2, and a front protector 33 and a front carrier 34 are attached. To a rear portion of the vehicle body frame 4, a rear fender 35 and a rear carrier 36 for covering over the rear wheels 3 are attached.

Figure 3:
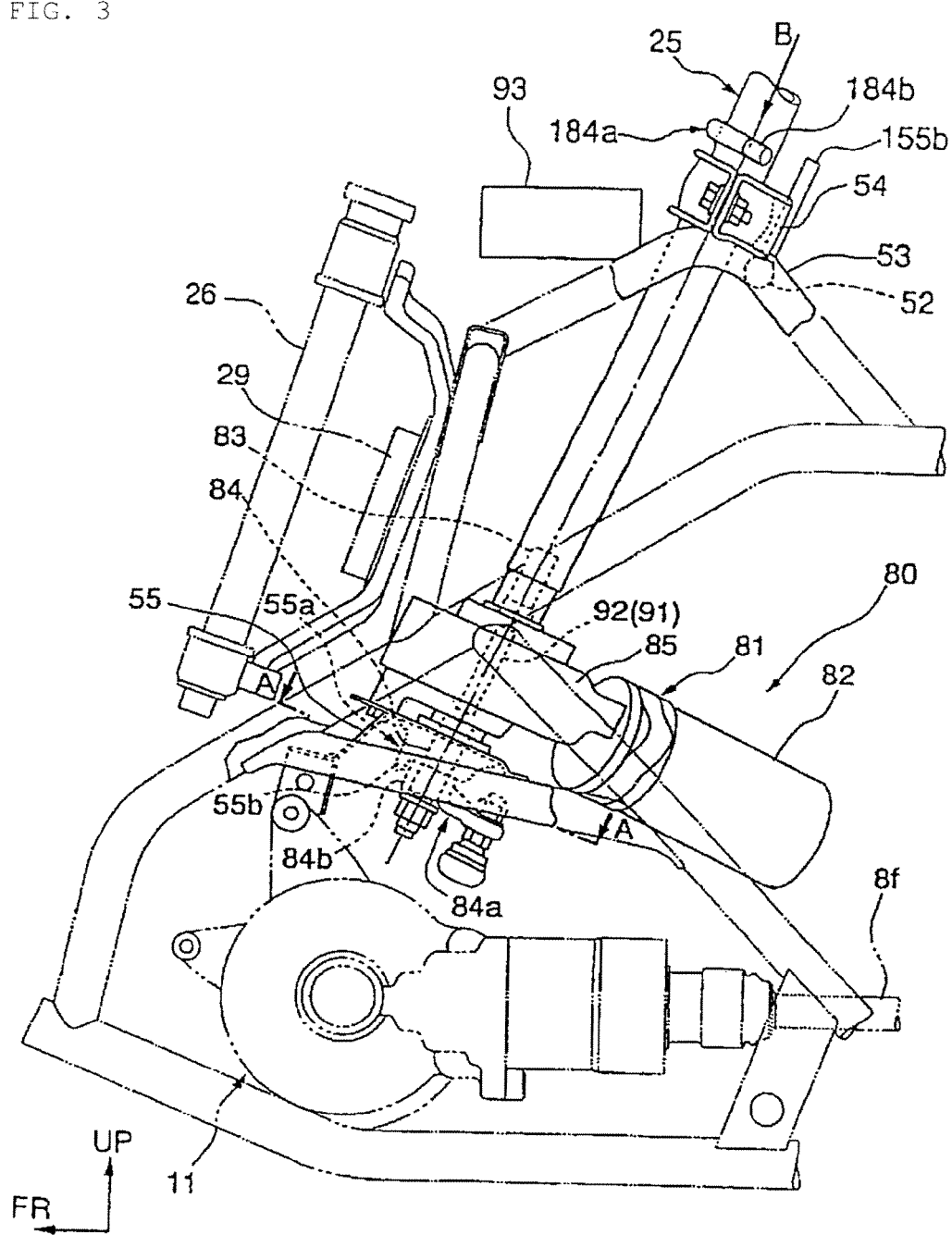
FIG. 3 is a partial enlarged side elevational view of FIG. 2.

FIG. 3 is a partial enlarged side elevational view of FIG. 2 showing the electric power steering apparatus. The steering shaft 25 is supported at an upper portion and a lower end portion thereof by an upper support bracket 54 and a lower support bracket 55 joined to the vehicle body frame 4, respectively. An electric power steering apparatus 80 can include an actuator unit 81 provided at an intermediate portion of the steering shaft 25, and a control unit 93 as an electronic control unit (ECU) for driving and controlling a power assisting motor 82 integrated with the actuator unit 81. The power assisting motor 82 is controlled based on a detection value of a torque sensor 91 as torque detection means provided in the actuator unit 81.

As shown in FIG. 3, the steering shaft 25 is connected at a lower end portion thereof coaxially to an input power shaft 83 of the actuator unit 81, and an output power shaft 84 coaxial with the steering shaft 25 and the input power shaft 83 is supported on the lower support bracket 55 through a bearing 55a. The input power shaft 83 and the output power shaft 84 are connected to each other through a torsion bar 92, which is part of the torque sensor 91, in a housing 85 of the actuator unit 81.

Since grounding resistance acts upon the front wheels 2, if the handle bar 24 is operated to turn to the right or to the left, then relative rotating force is generated between the input power shaft 83 mechanically connected to the handle bar 24 and the output power shaft 84 mechanically connected to the front wheels 2. As a result, since the torsion bar 92 is distorted, the steering torque of the handle bar 24 can be detected based on the distortion amount. The detection value of the steering torque is inputted to the control unit 93, and the power assisting motor 82 is driven in response to the detection value.

As the power assisting motor 82 is driven, when the handle bar 24 is operated to be turned, assisting force from the power assisting motor 82 is applied to the steering mechanism including the steering shaft 25 (output power shaft 84) in addition to the steering force from the handle bar 24. Therefore, the operating force of the handle bar 24 can be relatively moderate.

Figure 4:
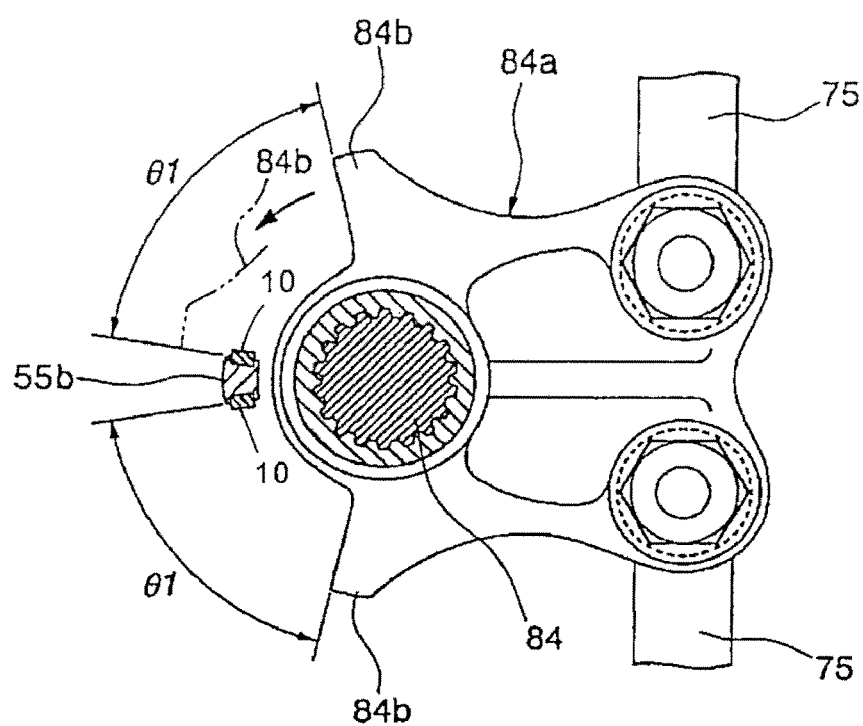
FIG. 4 is a sectional view taken along A-A of FIG. 3.

FIG. 4 is an enlarged sectional view of peripherals of the output power shaft 84. Referring to FIG. 4, a pair of left and right tie rods 75 extend in the widthwise direction of the vehicle 1 and are connected to the left and right front wheels 2. The tie rods 75 are connected at one end portion thereof (at an end portion on the opposite side to the side to which the front wheels 2 are connected) to a pitman arm 84a at a central portion in the vehicle body widthwise direction. The pitman arm 84a is spline-coupled to the output power shaft 84.

The pitman arm 84a is positioned directly downwardly of the lower support bracket 55 (refer to FIG. 3), and this pitman arm 84a and the bearing 55a cooperate with each other to form a handle stopper which defines a maximum steering position in the clockwise direction or counterclockwise direction of the steering shaft 25, that is, the handle bar 24. In particular, a stopper body 55b is provided in a projecting manner on the lower side of the bearing 55a, and abutting portions 84b are formed on left and right front faces of the pitman arm 84a. Thus, when the handle bar 24 is pivoted by a predetermined angle θ1 in the clockwise or counterclockwise direction from a state of a steering angle of 0 degrees, that is, a vehicle straightforwardly travelling state, one of the abutting portions 84b is brought into abutment with a side portion of one of the stopper bodies 55b and comes to a maximum steering state in which further handle operation is blocked. A maximum steering switch 10 (refer to FIG. 9) as maximum steering detection means is provided on a side portion of each of the stopper bodies 55b.

Figure 5:
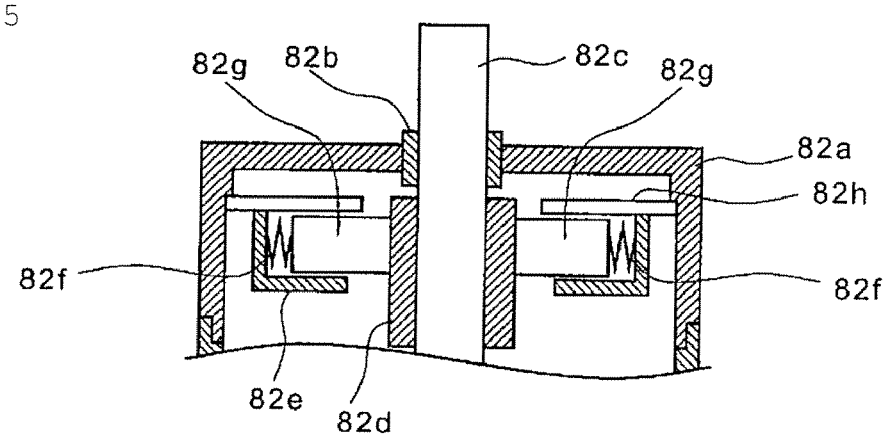
FIG. 5 is a side elevational sectional view of a power assisting motor.
Figure 6:
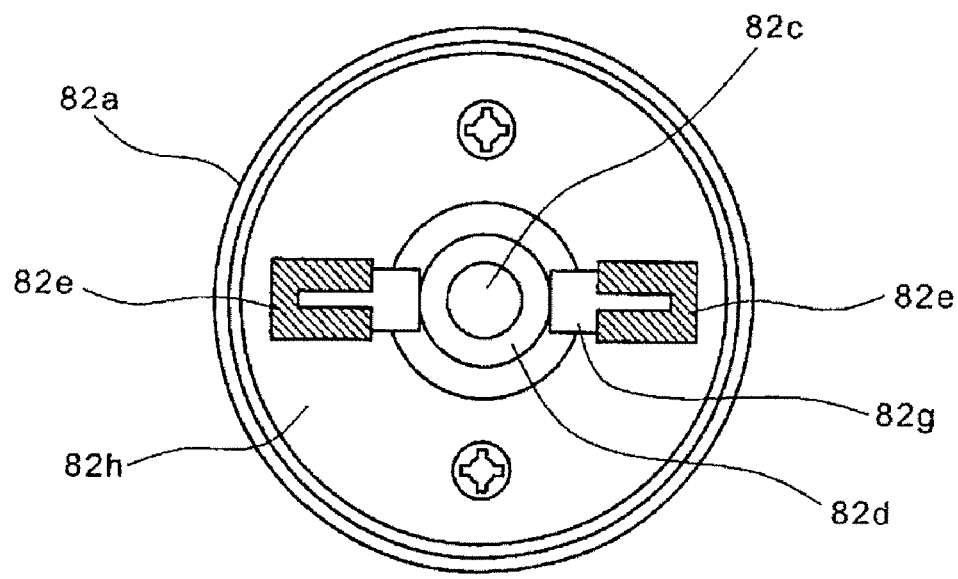
FIG. 6 is a front elevational sectional view of the power assisting motor.

FIG. 5 is a partial side elevational sectional view of the power assisting motor 82, and FIG. 6 is a front elevational sectional view of the power assisting motor 82. The power assisting motor 82 includes a housing 82a, a motor shaft 82c supported for rotation by a bearing 82b fitted in the housing 82a, a commutator 82d attached to the motor shaft 82c, and a brush 82g held on a brush holder 82e and biased by a spring 82f so as to contact with an outer periphery of the commutator 82d. The brush holder 82e is attached to the housing 82a through an insulating plate 82h.

Figure 7:
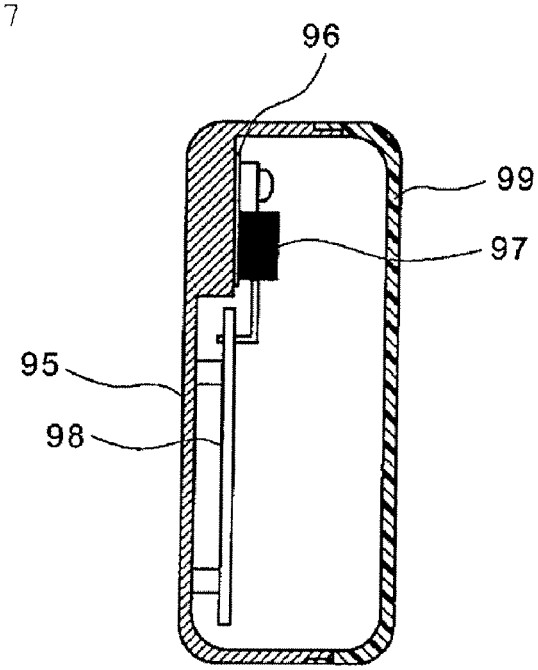
FIG. 7 is a sectional view of a motor control unit.
Figure 8:
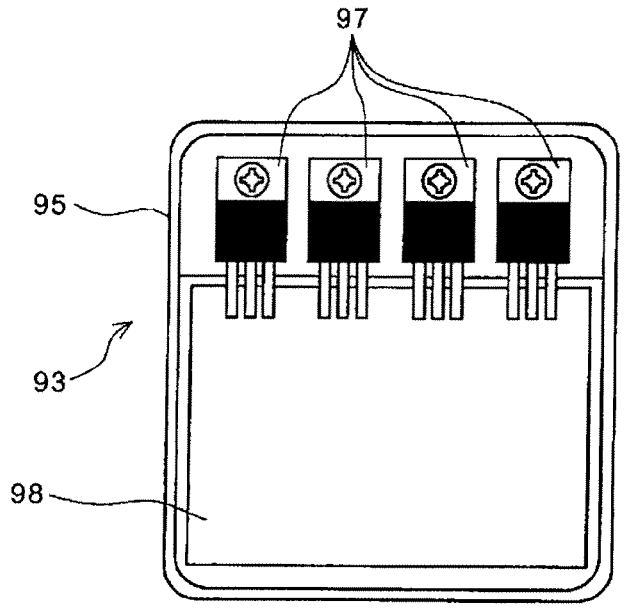
FIG. 8 is a front elevational view of the inside of the motor control unit.

FIG. 7 is a sectional view of an electric power steering control apparatus (control unit) 93, and FIG. 8 is a plan view of the control unit 93 in a state wherein a lid is removed. The control unit 93 includes a case 95 formed by aluminum die casting, four FETs 97 as switching elements disposed in the case 95 with an insulating sheet 96 interposed therebetween, a board 98 having the FETs 97 attached thereto, and a lid 99 made of a resin for fitting with the case 95. The FETs 97 are attached such that they are joined to the case 95 made of aluminum having a high thermal conductivity so as to have a high heat capacity.

Figure 9:
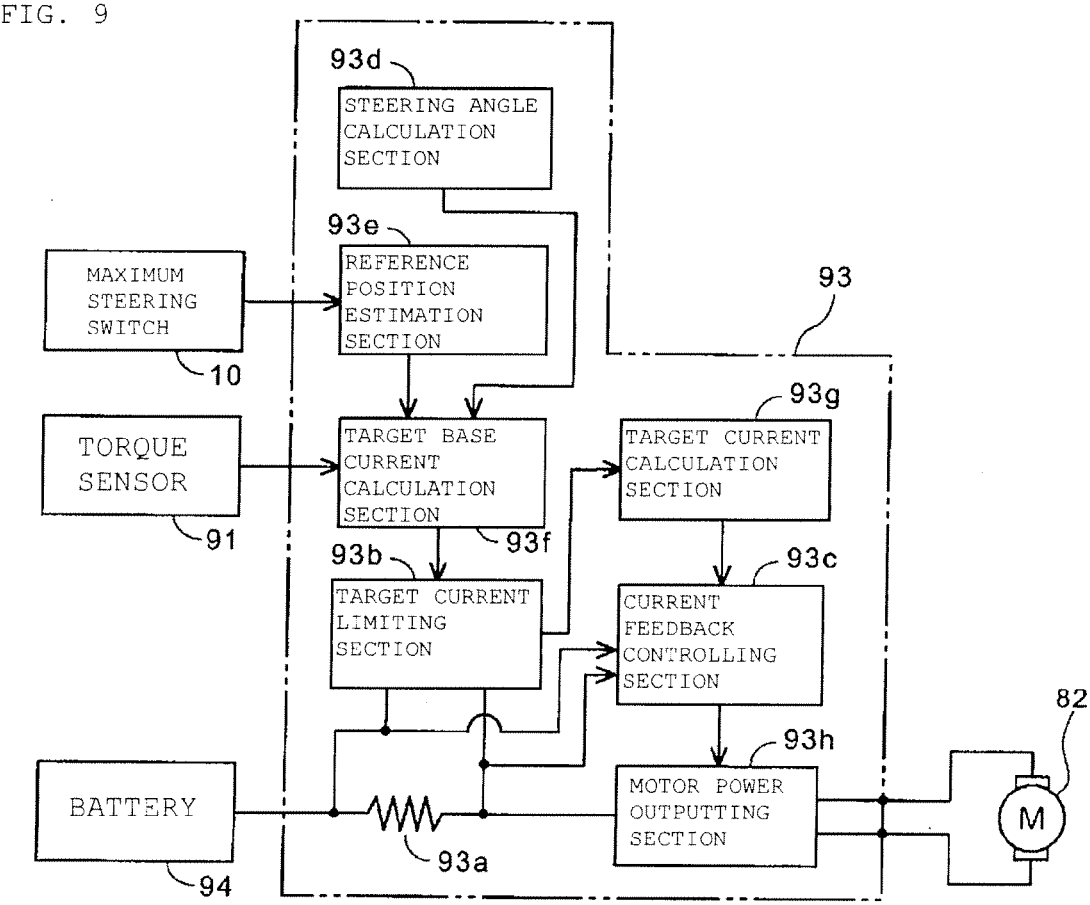
FIG. 9 is a block diagram showing functions of essential part of the electric power steering controlling apparatus.

FIG. 9 is a block diagram showing functions of part of the control unit 93. The control unit 93 detects the steering angle of the steering shaft 25 based on, for example, values of a maximum steering detection signal inputted from the maximum steering switch 10 and a voltage and current supplied to the power assisting motor 82 and controls the steering assisting force to the steering shaft 25 based on the detected steering angle.

The control unit 93 has a steering angle calculation section 93d for calculating the relative steering angle (steering angle from an arbitrary position) of the steering shaft 25, and a reference position estimation section 93e for estimating a steering reference position of the steering shaft 25 (steering reference state with respect to the vehicle body) based on the maximum steering detection signal.

A target base current calculation section 93f calculates a target base current value which is a motor current value to be used as a reference for steering driving force based on detected torque by the torque sensor 91 and an absolute steering angle of the steering shaft 25 (relative steering angle from the steering reference position) which can be found from the relative steering angle and the steering reference position described hereinabove. For the determination of the target base current value, it may be convenient to add the vehicle speed. The target base current value is inputted to a target current limiting section 93b.

A current sensor 93a for detecting current supplied to the power assisting motor 82 is provided, and a detection current value by the current sensor 93a is inputted to the target current limiting section 93b and a current feedback controlling section 93c.

In order to protect the power assisting motor 82 and a motor power outputting section 93h from overheating, the target current limiting section 93b can determine a limitation ratio (ratio) of current to be supplied to the power assisting motor 82 and calculates a limited target current value based on the ratio and the target base current value. In particular, the target current limiting section 93b calculates a brush temperature of the power assisting motor 82 and a temperature of the FETs which configure the switching circuit of the motor power outputting section 93h based on the supply current to the power assisting motor 82 and then calculates a target current value in response to the temperatures. It is to be noted that the target current limiting section 93b and calculation expressions to be used for the temperature estimation are hereinafter described.

A target current calculation section 93g applies inertia correction or damper correction to the target current value outputted from the target current limiting section 93b. The inertia correction can be configured to correct the target current value using a variation amount of the torque as a parameter. Taking motor inertia into consideration, the weight which the driver feels through the handle bar 24 upon starting of steering can be improved, and the steering feeling can be improved. The damper correction corrects the target current value using the speed of rotation of the power assisting motor 82 as a parameter. The correction value is set in a direction in which the target current value decreases as the speed of rotation increases. The reaction of the handle bar 24 can be made appropriate to improve the steering feeling.

Current from a battery 94 is supplied to the power assisting motor 82 through the motor power outputting section 93h. The motor power outputting section 93h is a switching circuit having a bridge configuration of the FETs 97 described hereinabove and varies the value of current to be supplied to the power assisting motor 82 in response to an on-duty instruction value of the FETs 97 inputted thereto. The current feedback controlling section 93c determines a duty instruction value so that the detection current value by the current sensor 93a may converge to a target current value and inputs the determined duty instruction value to the motor power outputting section 93h.

Since the power assisting motor 82 is controlled taking not only the steering torque detection value from the torque sensor 91 but also the absolute steering angle of the steering shaft 25 into consideration in this manner, it is possible to achieve such fine control as to vary the steering assisting force depending upon, for example, whether the handle bar 24 is turned from the vehicle straightforwardly advancing position or is turned back to the vehicle straightforwardly advancing position. Further, the current to be supplied to the power assisting motor 82 is limited by the estimated temperatures of the power assisting motor 82 and the motor control unit 93, and when any of the estimated temperatures becomes higher than a predetermined overheat protection temperature, the steering assisting force is reduced or is reduced to zero to protect the power assisting motor 82 and the motor controller unit (particularly the FETs 97) from overheating. The motor controller unit is a peripheral part to the power assisting motor 82.

A temperature estimation method of the power assisting motor 82 and the motor control unit 93 executed by the target current limiting section 93b is described in contrast with a prior art. Conventionally, overheat protection is carried out with reference to the temperature of a power assisting motor.

In the example described below, the temperature is estimated also with regard to the motor control unit through which current same as that which flows through the assisting motor flows, and the motor current is limited in accordance with a higher one of the estimated temperatures to protect the power assisting motor and the motor controller from overheating.

Further, conventionally the temperature of the power assisting motor 82 is estimated based on an accumulated value of the difference between the heat generation amount and the heat radiation amount. As described with regard to the expression 2, conventionally the heat radiation amount is set as the constant a, and it is assumed that a fixed amount of heat is radiated irrespective of whether the power assisting motor 82 is being energized. Then, since the constant a has a very low value, in such traveling state that energization continues, the cumulative value T corresponding to the temperature little decreases but tends to continue to rise. Accordingly, the target current value is limited in short time and generation of the steering assisting force is sometimes stopped.

Figure 10:
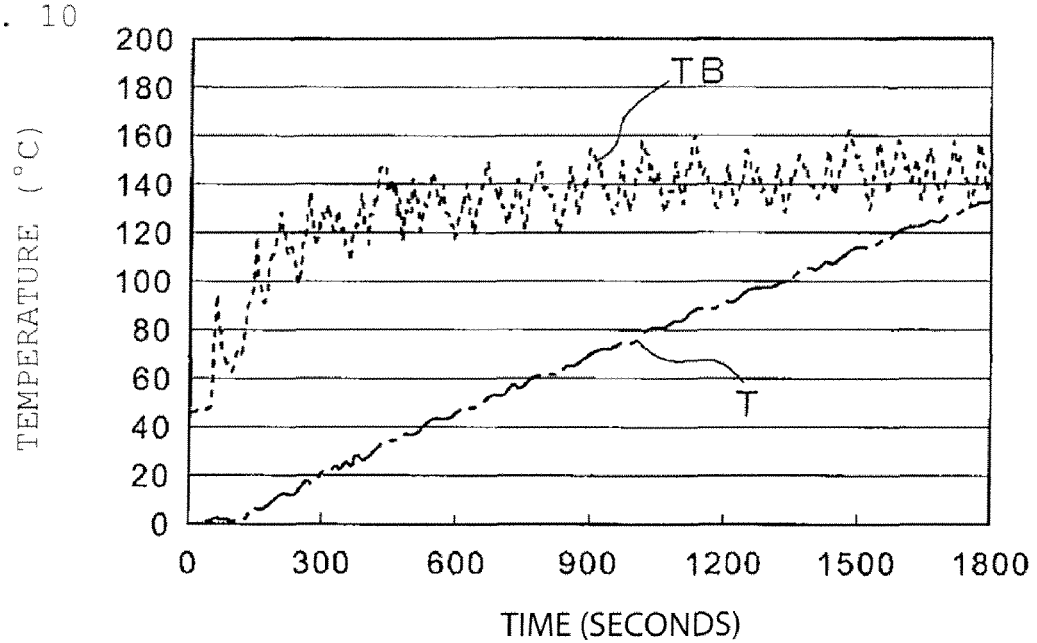
FIG. 10 is a view illustrating a cumulative value T which is a result of a motor temperature simulation in an off-road traveling condition and an actually measured temperature TB at a brush portion of the power assisting motor.

However, actually, for example, in off-road travelling in which a returning operation of the handle bar 24 occurs frequently, the temperature substantially exhibits an equilibrium by repetitions of heat generation and heat radiation. FIG. 10 is a view illustrating the cumulative value T calculated based on the expression 2 given hereinabove in an off-road traveling condition and the actually measured temperature TB at the brush portion of the power assisting motor 82. Although the cumulative value T continues to rise as seen in this figure, the actually measured temperature TB exhibits an equilibrium approximately at 140° C. If the cumulative value T continues to rise, then although the actually measured temperature TB is in an equilibrium state, the temperature represented by the cumulative value T exceeds a threshold value temperature (heatproof temperature) for limiting the target current value, and therefore, the target current value is limited and the application of the steering assisting force is stopped or reduced.

Figure 11:
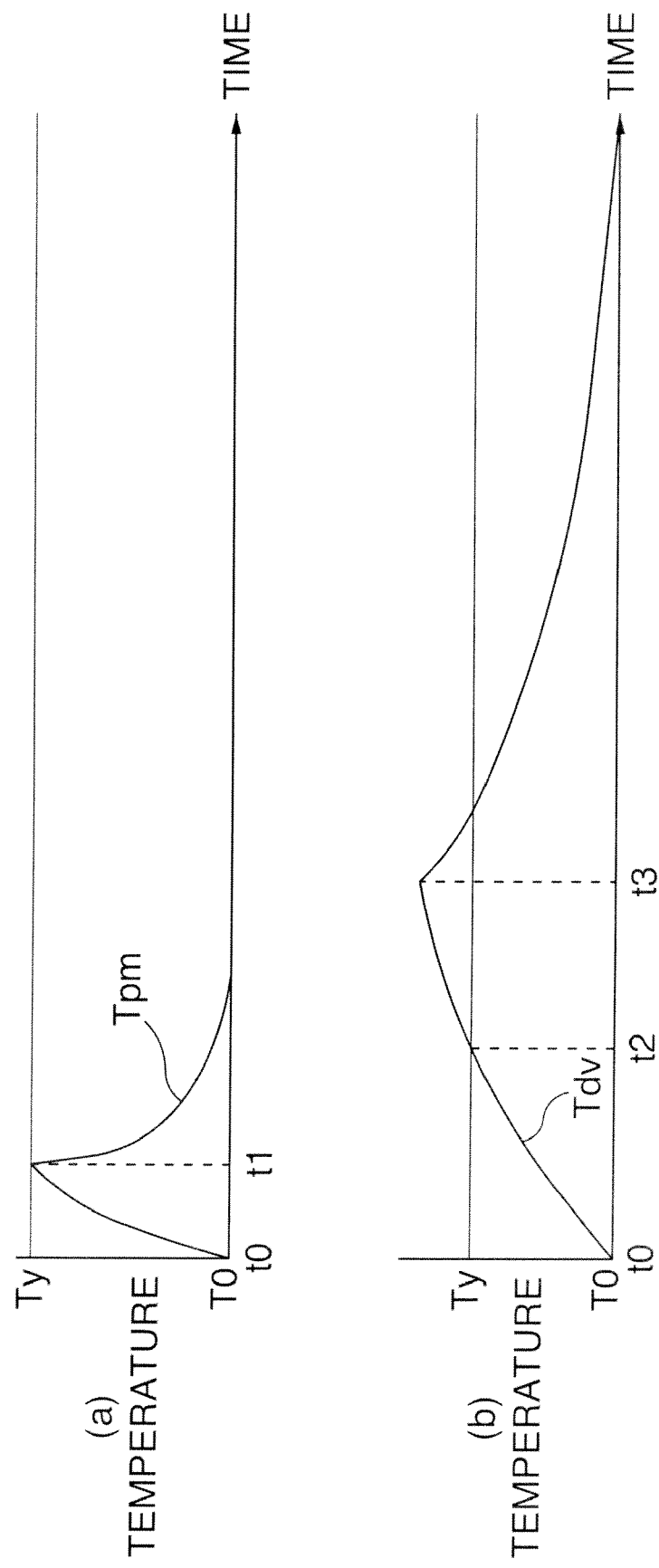
FIG. 11 provides views illustrating heat generation and heat radiation characteristics of parts included in a power steering apparatus.

Therefore, it may be possible to modify the expression 2 so that the actual temperature of the power assisting motor 82 can be represented by a calculated value. FIG. 11 is views of heat generation and heat radiation characteristics of the power assisting motor 82 and the motor control unit 93. The temperature of the power assisting motor 82 is represented by the temperature of the brush of the motor, and the temperature of the motor control unit 93 is represented by the temperature of the FETs 97.

Referring to (a) of FIG. 11, if energization of the power assisting motor 82 is started at time t0, then since the heat capacity of the brush is small, the temperature Tpm of the brush rises suddenly and reaches the heatproof temperature Ty at time t1. Then, if the energization is stopped at time t1 at which the temperature Tpm of the brush reaches the heatproof temperature Ty, then the temperature Tpm of the brush drops suddenly.

On the other hand, since the FET bridge circuit mounted on such a heat sink member as the case 95 has a great heat capacity, if energization is started at time t0 as seen in (b) of FIG. 11, then different from that in the case of the brush of the power assisting motor 82, the temperature Tdv rises slowly and reaches the heatproof temperature at time t2. Then, although the energization is stopped at time t2 for overheat protection, due to the great heat capacity, the temperature Tdv further continues to rise exceeding the heatproof temperature Ty, and then at time t3, the temperature Tdv begins to drop finally and drops slowly.

Figure 12:
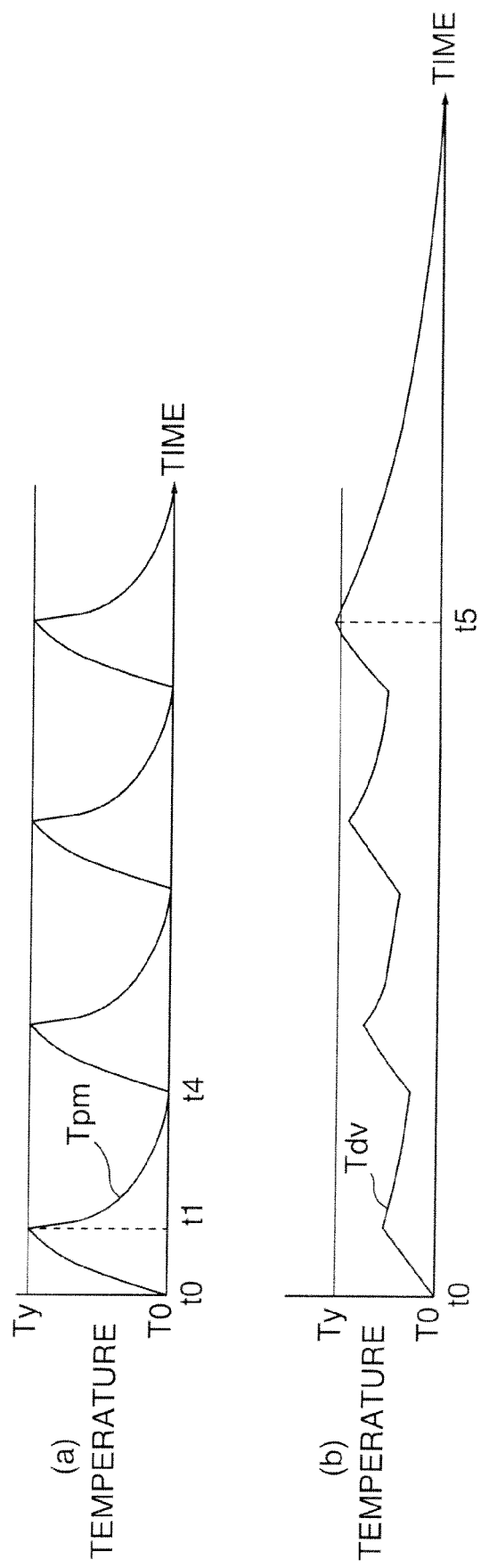
FIG. 12 provides views illustrating heat generation and heat radiation characteristics of the parts when a motor is energized intermittently.

Since energization of the power assisting motor 82 and the FETs 97 of the motor control unit 93 is started and stopped at the same timings, the temperature varies in the following manner. FIG. 12 are views illustrating temperature variations of the power assisting motor 82 and the motor control unit 93 where energization is started and stopped at the same timings. In (a) of FIG. 12, when the temperature Tpm of the power assisting motor 82 reaches the heatproof temperature Ty at time t1, the energization of the power assisting motor 82 is stopped, and when the temperature Tpm drops to the initial temperature T0 at time t4, energization is re-started.

If the motor control unit 93 is energized at the same timing as the energization timing described above, then the temperature Tdv of the motor control unit 93 varies as illustrated in (b) of FIG. 12. As illustrated in (b) of FIG. 12, at the same timing as the energization timing of the power assisting motor 82 which has a small heat capacity, the temperature of the motor control unit 93 having a great heat capacity cannot be controlled appropriately like the power assisting motor 82 because the degree of the temperature drop during stopping of energization is lower than that of the temperature rise during energization. Accordingly, the temperature Tdv soon exceeds the heatproof temperature at time t5, and the energization is stopped for overheat protection at time t5.

Figure 13:
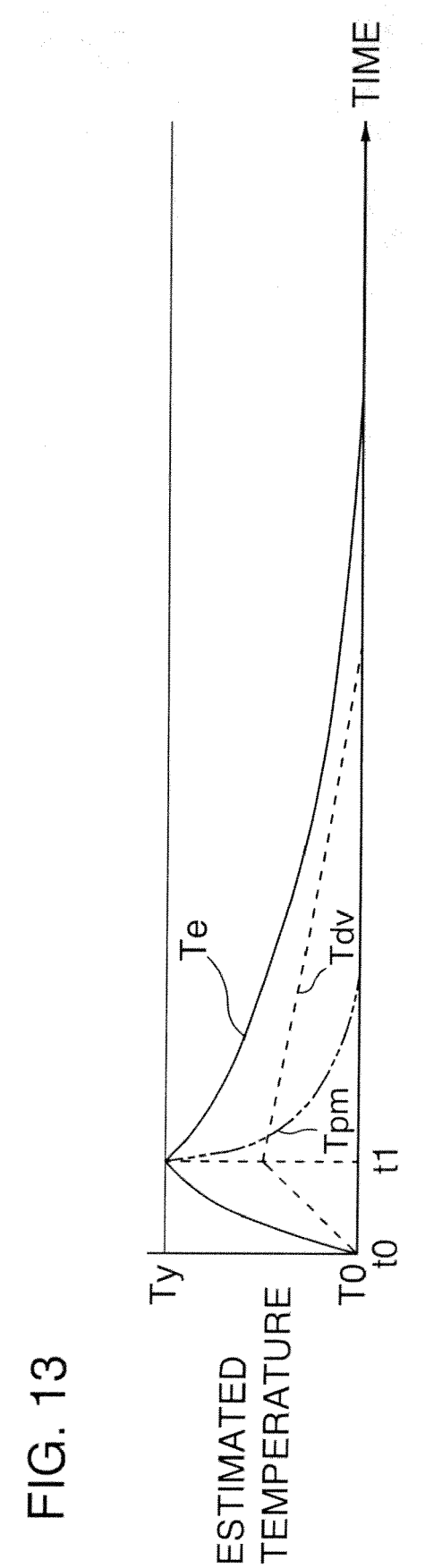
FIG. 13 is a view illustrating a variation of an estimated temperature calculated using a common calculation expression.

An example wherein the temperature is estimated based on a combination of the fast temperature rise and the slow temperature drop taking the characteristic just described into consideration is illustrated in FIG. 13. Referring to FIG. 13, if the temperature Tpm of the power assisting motor 82 and the temperature Tdv of the motor control unit 93 are laid on an estimated temperature Te, then the estimated temperature Te exceeds both of the temperature Tpm and the temperature Tdv, and control of stopping or decreasing current supply so that the estimated temperature Te does not exceed the heatproof temperature Ty should be carried out in accordance with the estimated temperature Te. However, the estimated temperature Te returns to the initial temperature T0 considerably later than the time at which the actual temperature Tpm or Tdv of the power assisting motor 82 or the motor control unit 93. Accordingly, the control may not cope with a situation in which power steering operation is carried out frequently.

Figure 14:
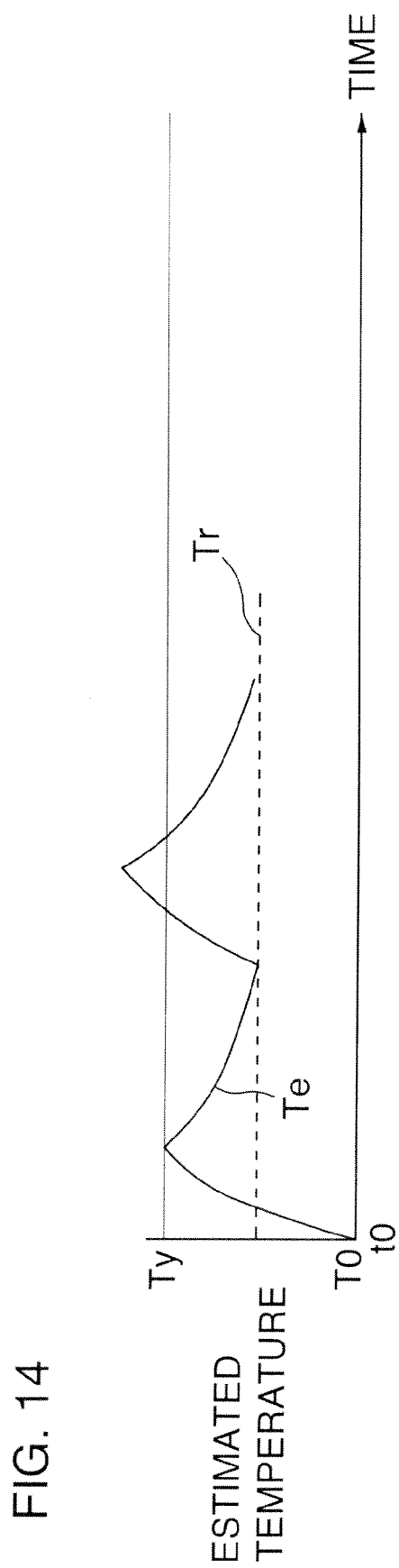
FIG. 14 is a view illustrating a variation of the estimated temperature where the motor is energized intermittently.

Therefore, it may be possible to resume energization at a point of time at which the estimated temperature Te drops to a reference temperature set to a rather high level than the initial temperature T0 to make frequent power steering operation possible. However, in this instance, the following fault appears. FIG. 14 is a view illustrating the estimated temperature Te where it is assumed to resume energization at a point of time at which the estimated temperature Te drops to a reference temperature Tr which is higher than the initial temperature T0. As illustrated in FIG. 14, since energization is resumed from the reference temperature Tr set somewhat higher than the initial temperature T0, while power steering operation can be returned in short time, the estimated temperature Te exceeds the heatproof temperature Ty in short time and current limitation is carried out again. In short, although power steering operation is returned a short time after current limiting operation, the time period in which the current is limited again also becomes shorter.

In this manner, a fault is forecast with a single estimation temperature. Therefore, it may be possible to calculate the estimation temperature for each of a plurality of parts (here, the power assisting motor 82 and the motor control unit 93) and select a lower one of target current values determined in response to the estimated temperatures to determine current to be supplied to the power assisting motor 82 and the motor control unit 93.

According to a result of a temperature simulation based on the expression 2, since the constant a is subtracted for every calculation irrespective of the difference between the temperature of the power assisting motor 82 and the ambient temperature, the estimated temperature Te drops linearly.

Therefore, the temperature should be estimated taking the difference between the temperatures of the power assisting motor 82 and the motor control unit 93 and the ambient temperature into consideration. The estimated temperature is estimated from the cumulative value TS of the heat generation amount. The estimation expression is such as given below.

Cumulative value $TS=\Sigma((\text{heat generation coefficient } Kup \times \text{current } I^2)-(\text{heat radiation coefficient } Kdn \times (\text{preceding cycle integrated temperature } Td-\text{ambient temperature } Tm)))+\text{initial temperature } T0$ (expression 3)

Upon setting of this estimation expression (expression 3), the heat generation coefficient Kup and the heat radiation coefficient Kdn are set such that the estimated temperature represented by the cumulative value TS may be higher than the actual temperature. The initial temperature T0 and the ambient temperature Tm are default values and should be set higher than estimated maximum values of the ambient temperatures of the power assisting motor 82 and the motor control unit 93.

Figure 15:
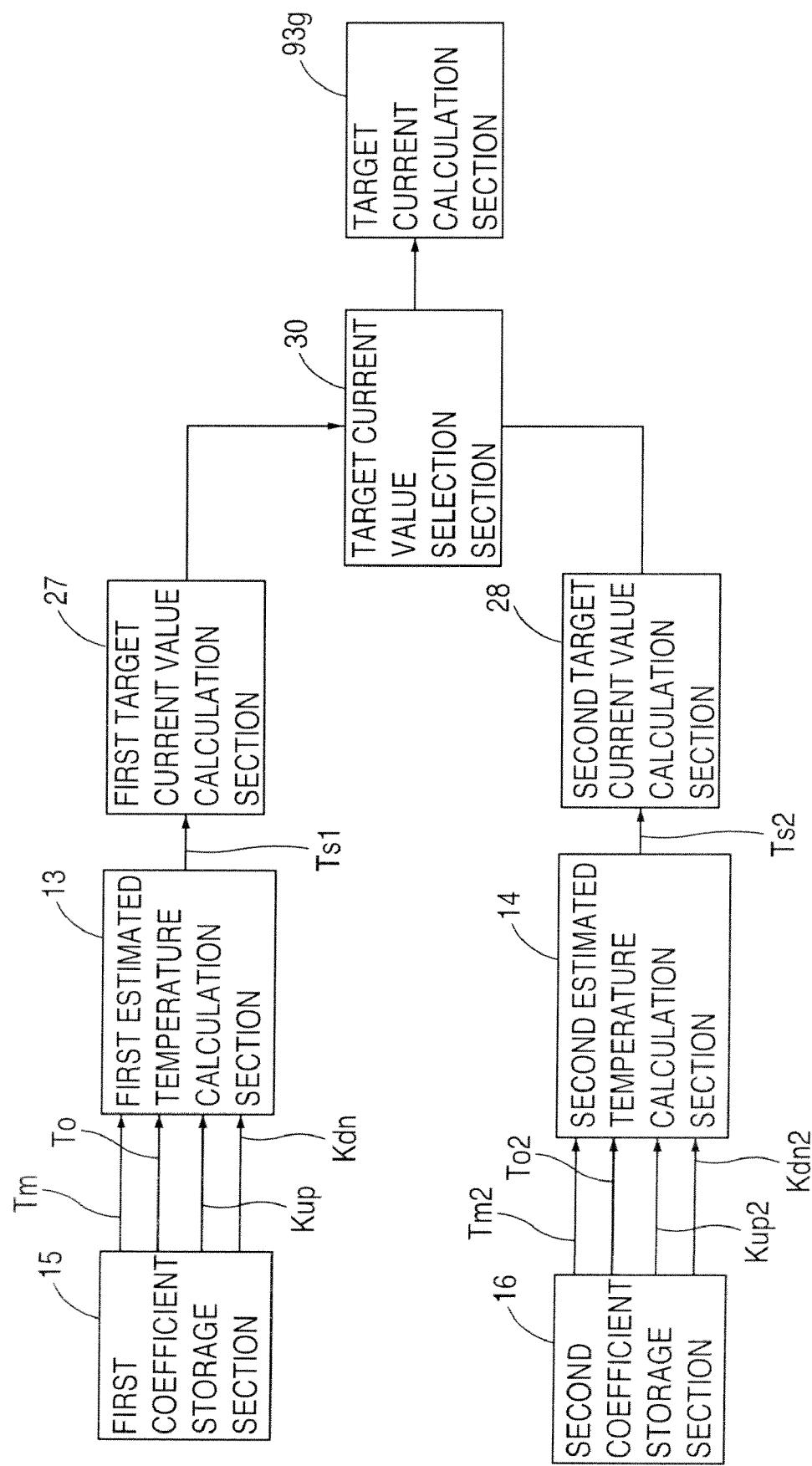
FIG. 15 is a detailed block diagram (part 1) of a target current limitation section in a reference example.

FIG. 15 is a block diagram showing functions of essential part of the target current limiting section 93b as an example. In a first coefficient storage section 15, the heat generation coefficient Kup, heat radiation coefficient Kdn, initial temperature T0 and motor ambient temperature Tm of the power assisting motor 82 are stored as correction coefficients. In a second coefficient storage section 16, a heat generation coefficient Kup2, a heat radiation coefficient Kdn2, an initial temperature T02 and a motor controller ambient temperature Tm2 as correction coefficients are stored.

A first estimated temperature calculation section 13 calculates an estimated temperature, that is, a cumulative value TS1, of the power assisting motor 82 using the estimation expression 3 given hereinabove based on motor current I and a correction coefficient inputted from the first coefficient storage section 15. A second estimated temperature calculation section 14 calculates an estimated temperature, that is, a cumulative value TS2, of the motor control unit 93 using the estimation expression (expression 3) given hereinabove based on the motor current and a correction coefficient inputted from the first coefficient storage section 15. However, upon calculation of the cumulative value TS2 of the motor control unit 93, the heat generation coefficient Kup, heat radiation coefficient Kdn, temperatures T0 and Tm in the estimation expression (expression 3) are replaced by Kup2, Kdn2, and the temperatures T02 and Tm2, respectively.

A first target current value calculation section 27 determines a first tentative target value for motor current based on a cumulative value TS1 representative of the estimated temperature of the power assisting motor 82 inputted from the first estimated temperature calculation section 13. A second target current value calculation section 28 determines a second tentative target value for motor current based on a cumulative value TS2 representative of the estimated temperature of the motor control unit 93 inputted from the second estimated temperature calculation section 14.

A target current value selection section 30, in this example, selects a lower one of the first tentative target value and the second tentative target value and sets the selected tentative target value as a target current value. If the motor current is limited in accordance with the lower value, then both of the power assisting motor 82 and the motor control unit 93 can be protected from overheating. The selected target current value is subjected to inertia damper correction by and outputted from the target current calculation section 93g.

Figure 16:
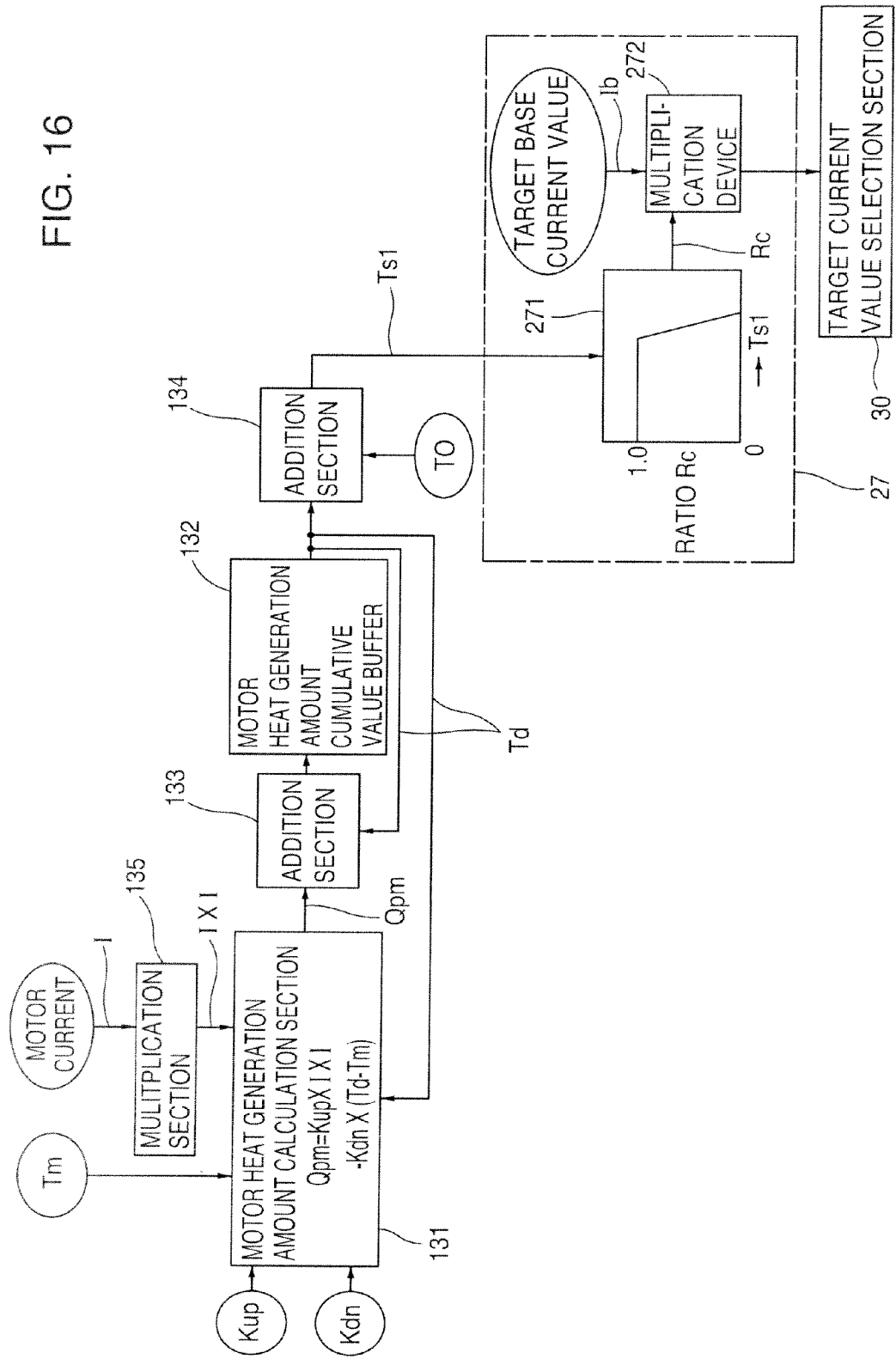
FIG. 16 is a detailed block diagram (part 2) of the target current limitation section in the reference example.

A particular example of the target current limiting section 93*b* is described. FIG. 16 is a block diagram (part 1) according to a particular example of the first estimated temperature calculation section 13. The first estimated temperature calculation section 13 has a motor heat generation amount calculation section 131, a motor heat generation amount cumulative value buffer 132, addition sections 133 and 134, and a multiplication section 135. The first target current value calculation section 27 has a current value ratio map 271 and a multiplication device 272.

A current value (motor current value) I detected by the current sensor 93*a* is squared by the multiplication section 135. A resulting value of the squaring of the motor current value I is inputted to the motor heat generation amount calculation section 131 together with a heat generation coefficient Kup and a heat radiation coefficient Kdn. Also an ambient temperature Tm of the power assisting motor 82 is inputted to the motor heat generation amount calculation section 131, and the motor heat generation amount Qpm calculated in accordance with the following expression 4.

$$\text{Motor heat generation amount } Qpm = Kup \times I^2 - Kdn \times (Td - Tm) \quad \text{(expression 4)}.$$

The motor heat generation amount Qpm is multiplied by the addition section 133 and inputted to the motor heat generation amount cumulative value buffer 132. The cumulative value of the motor heat generation amount Qpm is fed back as an integrated temperature Td to the motor heat generation amount calculation section 131. Further, the integrated temperature Td is inputted to the addition section 134 and is added to the initial temperature T0, and a cumulative value TS1 is outputted. A target current value of current to be supplied to the power assisting motor 82 is determined in accordance with the cumulative value TS1.

The cumulative value TS1 is inputted to the ratio map 271 provided in the first target current value calculation section 27, by which a current ratio, that is, a current limitation ratio, is determined. The ratio set to the ratio map 271 is "1.0" when the cumulative value TS1 has a value equal to or lower than a predetermined value, but if the cumulative value TS1 exceeds the predetermined value, then the ratio is "0." The multiplication device 272 multiplies a target base current value Ib by the ratio. Accordingly, when the ratio is equal to or lower than "1.0," the target base current value Ib is limited. The target current value outputted from the multiplication device 272, that is, the limited target base current value, is inputted to the target current value selection section 30.

Figure 17:
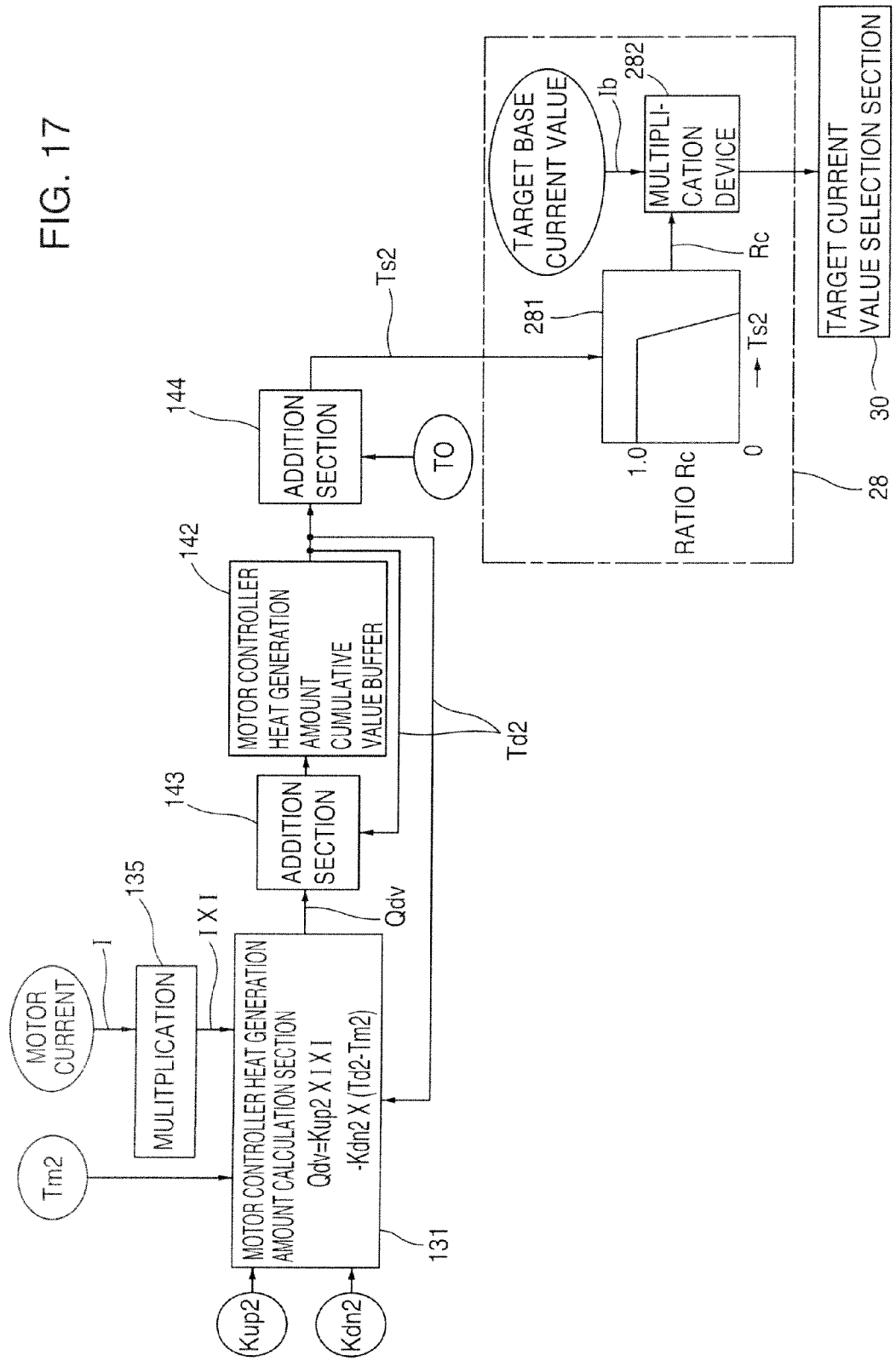
FIG. 17 is a block diagram showing functions of means for correcting the ambient temperature in the reference example.

FIG. 17 is a block diagram showing a particular example of the second estimated temperature calculation section 14. The second estimated temperature calculation section 14 includes a motor controller heat generation amount calculation section 141, a motor controller heat generation amount cumulative value buffer 142, addition sections 143 and 144, and a multiplication section 145. Further, the second target current value calculation section 28 includes a current value ratio map 281 and a multiplication device 282.

A current value (motor current value) I detected by the current sensor 93*a* is squared by the multiplication section 145. A resulting value of the squaring of the motor current value I is inputted to the motor controller heat generation amount calculation section 141 together with a heat generation coefficient Kup2 and a heat radiation coefficient Kdn. Also an ambient temperature Tm2 of the motor control unit 93 is inputted to the motor controller heat generation amount calculation section 141, and motor heat generation amount Qdv is calculated in accordance with the following expression 5.

$$\text{Motor heat generation amount } Qdv = Kup2 \times I^2 \times Kdn2 \times (Td2 - Tm2) \quad \text{(expression 5)}.$$

The motor heat generation amount Qdv is accumulated by the addition section 143 and then inputted to the motor controller heat generation amount cumulative value buffer 142. The accumulated value of the motor heat generation amount Qdv, that is, a cumulative temperature Td2, is fed back to the motor controller heat generation amount calculation section 141. Further, the cumulative temperature Td2 is inputted to and added to the initial temperature T0 by the addition section 144, from which a cumulative value (estimated temperature) TS2 is outputted.

The configuration and operation of the second target current value calculation section 28 are similar to those of the first target current value calculation section 27, and therefore, description of them is omitted.

In the example of the target current limiting section 93*b* described above, the ambient temperatures Tm and Tm2 are fixed values. However, if a space in which the heat is likely to persist is assumed, then it is inconvenient to make the ambient temperatures Tm and Tm2 as fixed values. Therefore, the ambient temperatures Tm and Tm2 should be calculated with persistence of the heat taken into consideration. The ambient temperature Tm is calculated in accordance with the following expression 6.

$$\text{Motor controller ambient temperature } Tm2 = \Sigma((\text{heat generation coefficient } Kmup \times \text{current } I^2) - (\text{heat radiation coefficient } Kmdn \times (\text{preceding cycle ambient temperature } Tm - \text{ambient temperature } Tm0))) + \text{initial temperature } T0 \quad \text{(expression 6)}.$$

This expression 6 is configured similarly to the expression 3 although the coefficients are different. Also the motor controller ambient temperature Tm2 is calculated using this expression similarly to the ambient temperature Tm. It is to be noted that the heat generation coefficient Kmup and the heat radiation coefficient Kmdn may be common to the heat generation coefficient Kup and the heat radiation coefficient Kdn.

On the other hand, where the surroundings of the power assisting motor 82 are a comparatively open space, the ambient temperature Tm can be calculated approximately in accordance with the following expression 7.

$$\text{Ambient temperature } Tm = \Sigma((\text{heat generation coefficient } Kmup \times \text{current } I^2 - a) \quad \text{(expression 7)}.$$

The expression 7 is a simple expression wherein the heat radiation amount is the constant a.

Which one of the expression 6 and the expression 7 should be used as a calculation expression of the ambient temperature Tm should be determined in response to a situation of the space surrounding the power assisting motor 82 or the motor control unit 93 (such as where the space is great or small, whether the number of heat generating members therearound is great or small, and so forth).

Figure 18:
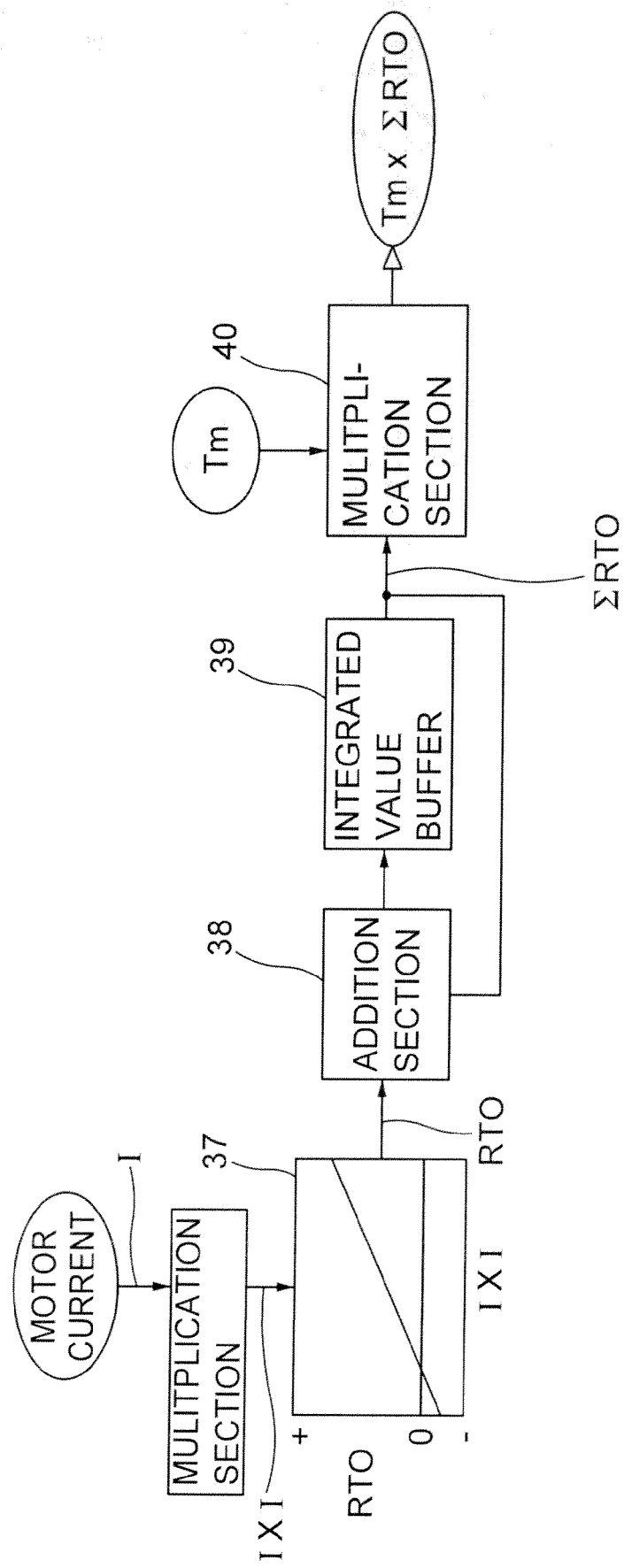
FIG. 18 is a detailed block diagram (part 3) of the target current limitation section in the reference example.

Alternatively, the heat generation coefficient Kmup and the heat radiation coefficient Kmdn may be set as fixed values such that correction of the ambient temperatures Tm and Tm2 may be carried out as a function of the motor current I. FIG. 18 is a block diagram showing functions of part for calculating the ambient temperatures Tm and Tm2 as a function of the motor current I setting the heat generation coefficient Kmup and the heat radiation coefficient Kmdn as fixed values. Referring to FIG. 18, an integration coefficient calculation section 37 outputs an integration coefficient RTO as a function of the motor current $I^2$ and can be configured from a map. The integration coefficient calculation section 37 calculates, when the motor current I is inputted thereto, a corresponding integration coefficient RTO from the map and inputs the integration coefficient RTO to an addition section 38. The addition section 38 adds the integration coefficient RTO inputted latest from the integration coefficient calculation section 37 to the accumulated integration coefficient ΣRTO accumulated in an integrated value buffer 39. The added integration coefficient RTO is inputted as a new accumulated integration coefficient ΣRTO to the integrated value buffer 39.

The accumulated integration coefficient ΣRTO accumulated in the integrated value buffer 39 is inputted to a multiplication section 40, and the multiplication section 40 multiplies the default motor ambient temperature Tm by the accumulated integration coefficient ΣRTO to correct the motor ambient temperature Tm. The corrected motor ambient temperature Tm is supplied to the motor heat generation amount calculation section 131.

Also the motor controller ambient temperature Tm2 is corrected by a similar configuration to that shown in FIG. 18 and supplied to the motor controller heat generation amount calculation section 141.

By using the target current limitation section described, it is possible to estimate the temperature of the power assisting motor 82 or the motor control unit 93 to achieve prevention of overheating of them without using a temperature sensor. In particular, the current is controlled with a target current value determined based on a ratio read out from the current value ratio map 271 or 281. However, if the current is limited, then since the cumulative value TS1 or TS2 calculated based on the current value decreases, the ratio rises in accordance with the current value ratio map 271 or 281 and the current limitation is moderated. Consequently, since the current increases, the cumulative values TS1 and TS2 increase again and the ratio drops to decrease the current, the ratio rises again. In this manner, after the ratio drops from 1.0 in accordance with the cumulative values TS1 and TS2, the limited current varies bit by bit in the proximity of a certain current value and enters an equilibrium state. Consequently, the current cannot be limited to a value lower than the current value.

Figure 19:
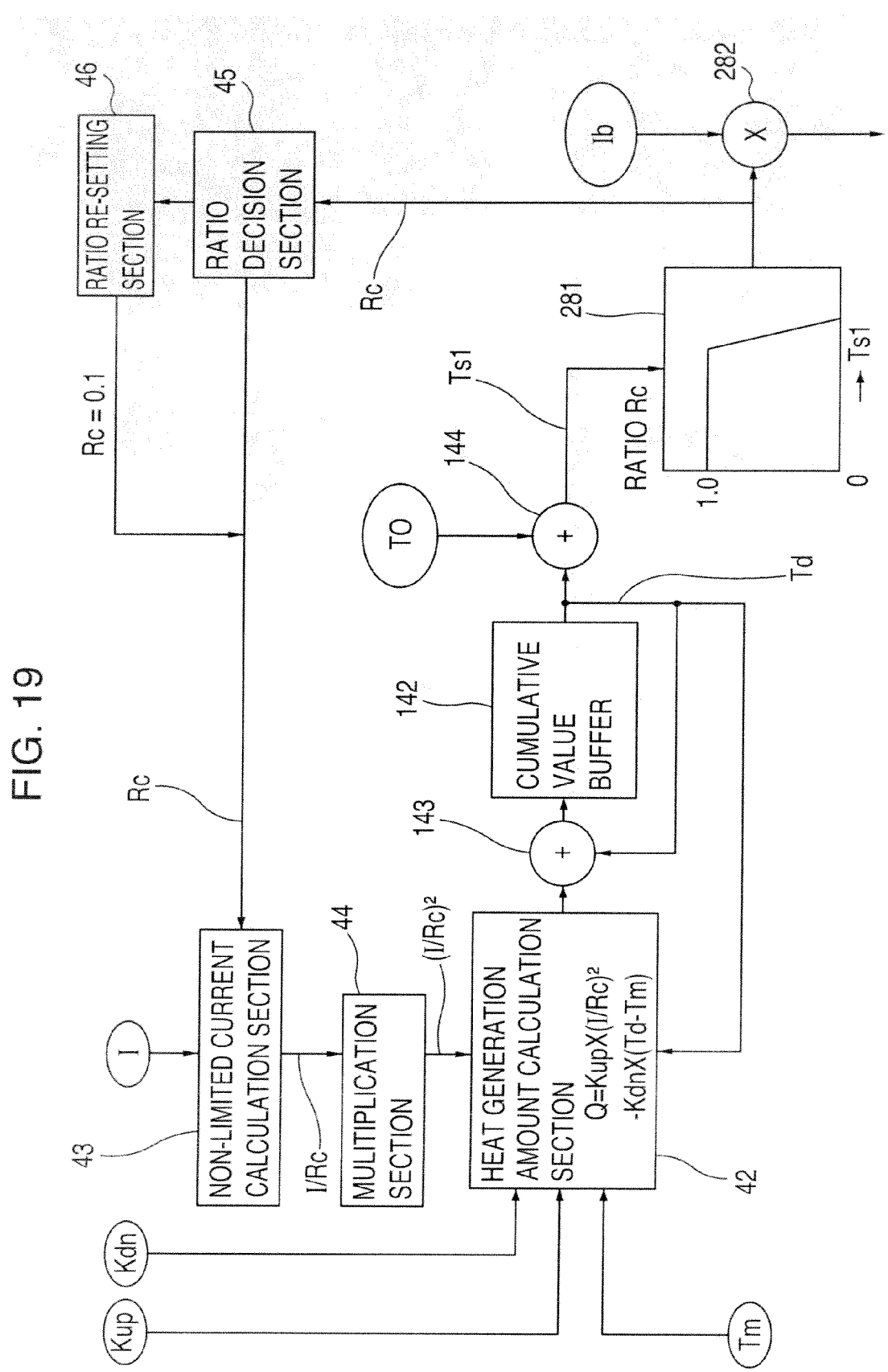
FIG. 19 is a functional block diagram of essential part of the target current limitation section which can prevent an equilibrium state of current.

The next example may be able to limit the current to a value lower than the current value. FIG. 19 is a block diagram of functions of part of the target current limitation section according to an example which can prevent an equilibrium state of the current, and like reference characters to those of FIG. 16 denote like or equivalent elements. Although a motor heat generation amount calculation section 42 is similar to the motor heat generation amount calculation section 131 described hereinabove, it is different in that it uses the following expression 8 in place of the calculation expression 5 given hereinabove to calculate the heat generation amount Qpm of the power assisting motor 82.

Motor heat generation amount $Qpm = Kup \times (1/Rc) \times (1/Rc) - Kdn \times (Td - Tm)$ (expression 8).

In other words, the motor heat generation amount calculation section 42 includes a calculation expression (expression 8) wherein "I" in the expression 4 given hereinabove is replaced by "I/Rc."

A non-limited current calculation section 43 divides the motor current I at present by the ratio Rc at present to calculate the current when the target current is not limited with the current ratio. A multiplication section 44 squares the output (1/Rc) of the non-limited current calculation section 43 and inputs a resulting value to the motor heat generation amount calculation section 42.

The motor heat generation amount calculation section 42, in this instance, calculates a heat generation amount Qm based on the value (1/Rc)×(1/Rc) inputted from the multiplication section 44, the heat generation coefficient Kup, heat radiation coefficient Kdn, ambient temperature Tm, current value I/Rc, and the integrated temperature Td fed back and inputted from the cumulative value buffer 142, and outputs the heat generation amount Qm to the addition section 133. The output of the cumulative value buffer 142, that is, the integrated temperature Td, is inputted to the addition section 134, by which it is added to the initial temperature T0, and a cumulative value TSm is outputted. In this manner, the cumulative value TSm calculated based on the current I/Rc where no limitation is applied continues to increase without decreasing even if the ratio drops. Accordingly, the ratio drops in a corresponding relationship, and the target current is limited.

A ratio decision section 45 decides whether or not the ratio Rc at present is lower than a predetermined value (zero or a predetermined lower limit ratio). If the ratio Rc is not lower than the predetermined value, then the ratio decision section 45 inputs the ratio Rc to the non-limited current calculation section 43. If the ratio at present exhibits a drop to the predetermined value, then a ratio re-setting section 46 is excited. The ratio re-setting section 46 inputs "1.0" as the ratio Rc to the non-limited current calculation section 43. By this re-setting of the ratio, that is, by the resetting, a fault by division of the current I by the ratio Rc=0 is prevented, and increase of the cumulative value TS1 in a state wherein the current is limited sufficiently can be prevented.

Where the current limiting state continues for a long period of time, a fault that the cumulative value TS1 increases excessively and excessively long time is required until the accumulated value decreases after the steering operation is stopped and consequently it becomes late that an ordinary state is restored from the current limiting state may possibly occur. By resetting the ratio Rc to "1," restoration of a normal state from the current limiting state is permitted in appropriate time.

It is to be noted that, while the non-limited current calculation section 43 divides the motor current at present by the ratio at present to calculate the current value for calculation of the heat generation amount, this non-limited current value calculation section can otherwise correct the actual current value to a rather high value using the ratio.

Also the motor controller heat generation amount calculation section 141 can be configured similarly to the motor heat generation amount calculation section 42 for the motor heat generation amount calculation section 131.

In the example described above, different calculation expressions are used for the power assisting motor 82 and the motor control unit 93 to estimate the temperatures to calculate target current values and the current is limited to a lower one of the target current values. Accordingly, the individual estimated temperatures determined by calculation can be approximated to the actual temperatures illustrated in FIG. 12, and the timing at which limitation of the current is applied is not excessively early and besides resumption of energization does not become late. Thus, the power assisting motor 82 and the motor control unit 93 can be protected appropriately from overheating.

In the overheat protection apparatus described above, heat generation characteristics, heat radiation coefficients, ambient temperatures, initial temperatures and so forth which are different between the power assisting motor 82 and the motor control unit 93 are set in advance. Among those, the heat generation coefficients and the heat radiation coefficients of the power assisting motor 82 and the motor control unit 93 which are influenced directly by the heat capacity are at least set individually for exclusive use while the others may be common coefficients. Further, as regards the ratio map, while different values for exclusive use may be provided for temperature estimation of the power assisting motor 82 and the motor control unit 93, also it may be possible to commonly use a single ratio map.

Incidentally, the overheat protection apparatus may address the situation that the program is complicated because the estimated temperature calculation section and the target current value calculation section are required for the power assisting motor 82 and the motor control unit 93, respectively. Therefore, in the overheat protection apparatus of the present embodiment described below, overheat protection of the power assisting motor 82 and the motor control unit 93 can be carried out by a single estimation temperature calculation section and a single target current calculation section.

Figure 20:
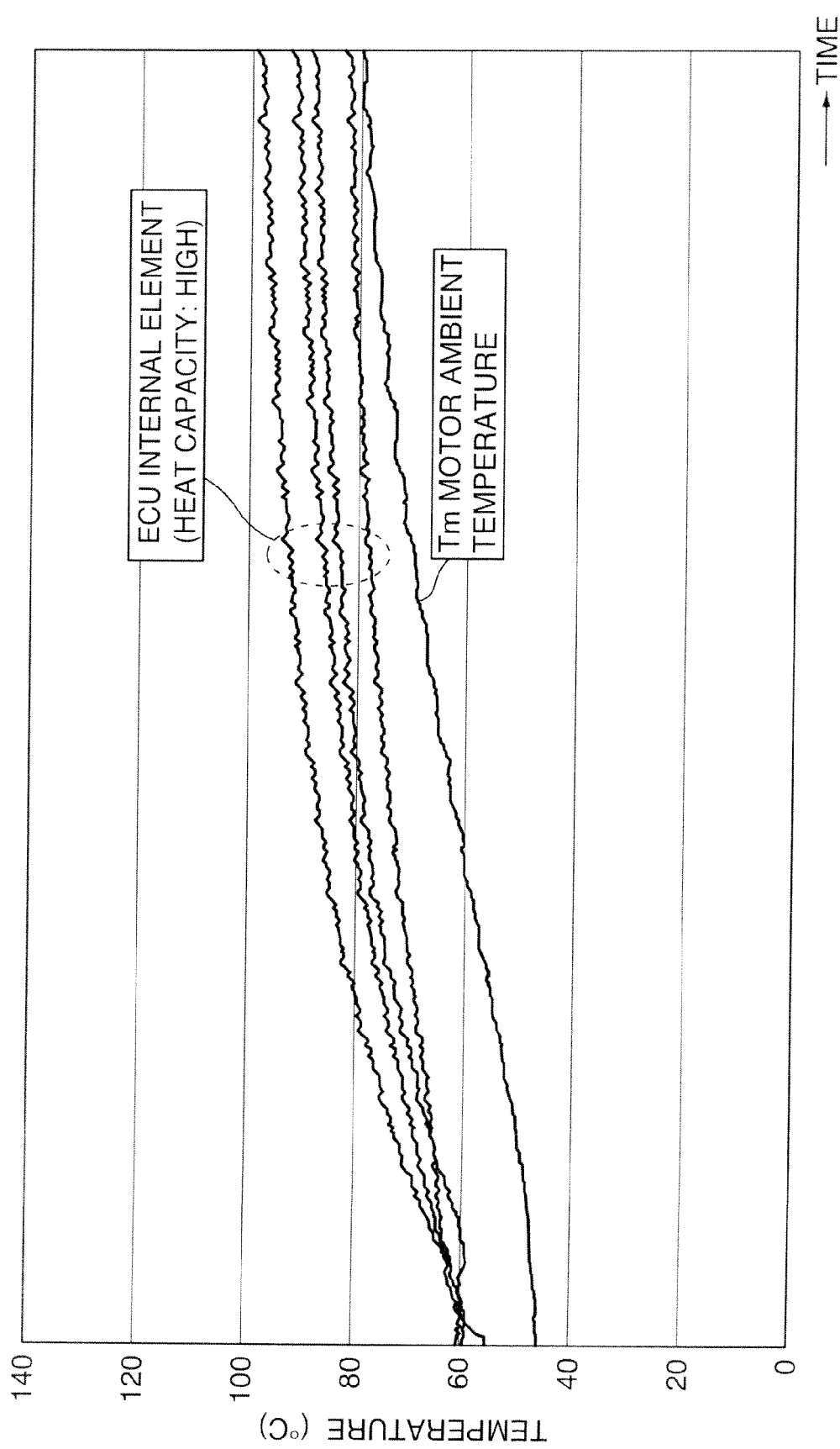
FIG. 20 is a view illustrating the motor ambient temperature and the temperature of a field effect transistor (FET) in the motor control unit upon off-road traveling.

First, FIG. 20 is a view illustrating the motor ambient temperature Tm upon off-road traveling of the vehicle 1 and the temperature of the FETs 97 (refer to FIG. 8) in the inside of the motor control unit 93. In FIG. 20, the temperature is a measurement value of each of the four FETs 97 in the inside of the ECU. As can be recognized from FIG. 20, the motor ambient temperature and the temperatures of the FETs 97 have a correlation. Accordingly, the motor ambient temperature Tm can be used as a temperature estimated value of the motor control unit 93.

FIG. 1 is a block diagram showing functions of part of the target current limiting section 93b according to an embodiment of the present invention. The target current limiting section 93b according to the present embodiment is configured such that, different from the reference example shown in FIG. 15, it calculates a target current value which is a limited current value based on a temperature estimated value of a motor and the temperature estimated value of the motor control unit 93 is represented by a motor ambient temperature taking the correlation illustrated in FIG. 20 into consideration. Then, where the motor ambient temperature or the motor temperature estimation value is within a predetermined normal range, the limited current value is determined based only on the temperature estimated value of the motor, but when the estimated value of the motor in an on state or the motor ambient temperature becomes higher than the predetermined value away from the normal range, the calculation expression of the heat generation amount calculation section is changed over.

Referring to FIG. 1, in a coefficient storage section 150, the heat generation coefficient Kup, heat radiation coefficient Kdn and initial temperature T0 of the power assisting motor 82 are stored in advance as correction coefficients.

An estimated temperature calculation section 130 uses the estimation expression 3 given hereinabove to calculate the estimated temperature of the power assisting motor 82, that is, a cumulative value T, based on the motor current I inputted from the current sensor 93a, the heat generation coefficient Kup, heat radiation coefficient Kdn and initial temperature T0 inputted from the coefficient storage section 150 and the motor ambient temperature Tm inputted from the coefficient storage section 150. It is to be noted that a motor ambient temperature sensor 160 is attached to an arbitrary location around the power assisting motor 82 utilizing, for example, an outer wall of the housing 85 of the actuator unit 81 or the like.

A target current value calculation section 270 determines a target value for the motor current based on the cumulative value T indicative of the estimated temperature of the power assisting motor 82 and inputted from the estimated temperature calculation section 130. The target current value calculation section 270 includes a current upper limit map (hereinafter described) which outputs a current limitation value in response to the cumulative value T and a ratio map (hereinafter described) which outputs a ratio of the power assisting motor 82 in response to the cumulative value T. A target value for the motor current is determined in two channels.

A target current value selection section 300 selects a lower one of the two motor current target values determined using the two maps described hereinabove and determines the selected motor current target value as a final target current value.

Figure 21:
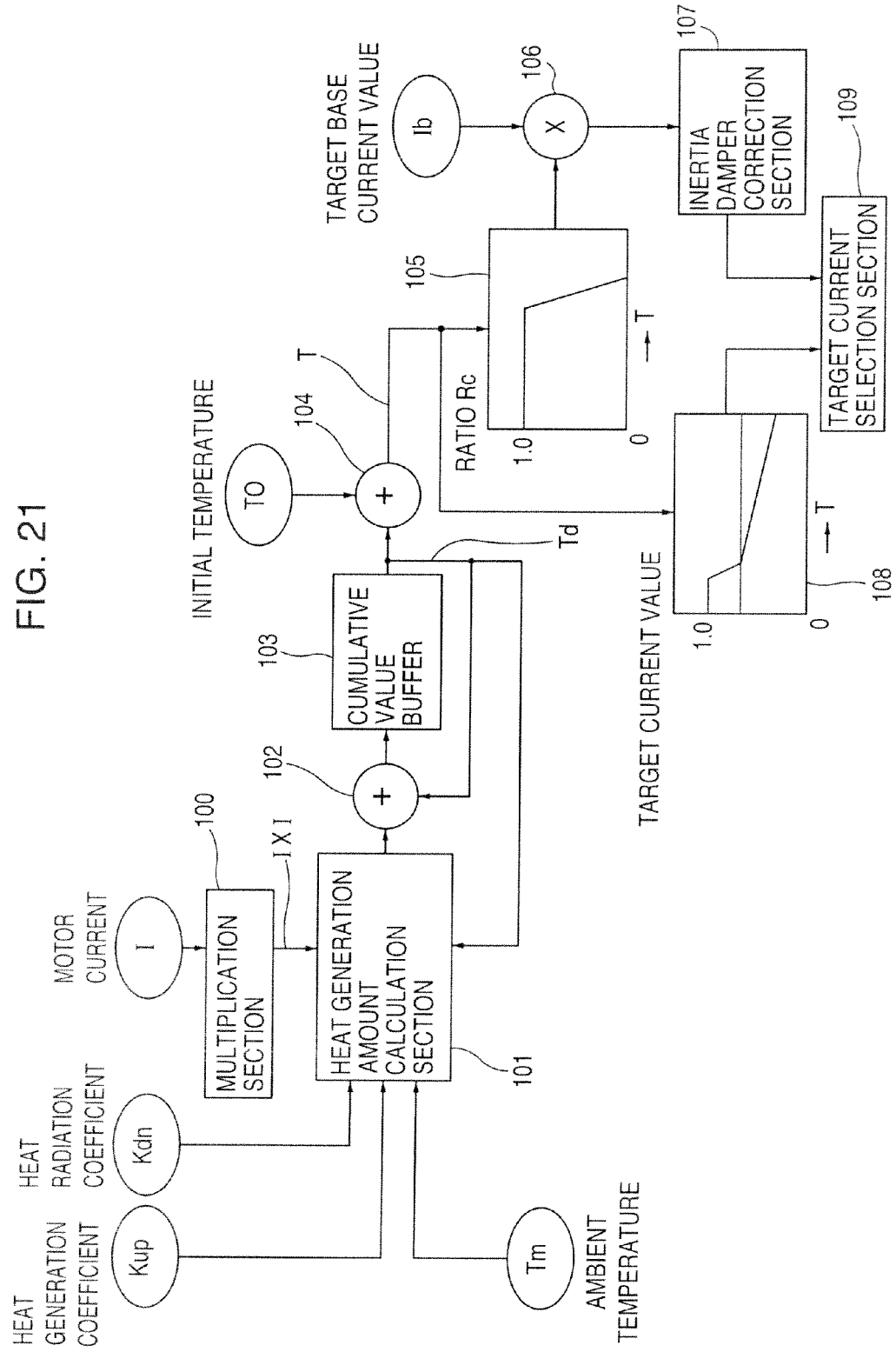
FIG. 21 is a block diagram illustrating a function of essential part of the target current limitation section in the embodiment of the present invention.

FIG. 21 is a block diagram showing a more detailed configuration of the target current limitation section according to the embodiment of the present invention, and like reference characters to those of FIGS. 9, 16 and 17 denote like or equivalent elements. Referring to FIG. 21, a multiplication section 100 squares the current value I detected by the current sensor 93a. The squared current value $I^2$, heat generation coefficient Kup and heat radiation coefficient Kdn, and motor ambient temperature Tm are inputted to a heat generation amount calculation section 101. The heat generation amount calculation section 101 uses the coefficients and so forth inputted thereto to calculate a heat generation amount Q. The heat generation amount Q is calculated in accordance with a plurality of calculation expressions selected based on the motor ambient temperature Tm and the current value $I^2$. The calculation expressions and selection of them are hereinafter described.

The calculated heat generation amount Q is accumulated by an addition section 102, and the accumulated value $\Sigma Q$ of the heat generation amount Q is stored as an integrated temperature Td into a cumulative value buffer 103, which may also be known as an integration section. The integrated temperature Td is fed back to the heat generation amount calculation section 101 and used for calculation of a heat generation amount by the heat generation amount calculation section 101 and is inputted to an addition section 104, by which it is added to the initial temperature T0. Consequently, a temperature estimated value T is outputted from the addition section 104. In other words, the temperature estimated value T is T0+Td.

In this embodiment, a target current value to be supplied to the power assisting motor 82 is determined in accordance with this temperature estimated value T. First, the temperature estimated value T is inputted to a ratio map 105, by which a current ratio, that is, a current limitation ratio, is determined. The ratio set to the ratio map 105 is "1.0" when the temperature estimated value T assumes a value up to the predetermined value, but is "0" in a region exceeding this predetermined value. A multiplication section 106 multiplies a target base current value Ib by the ratio. Accordingly, when the ratio is lower than "1.0," the current value is limited. The target current value outputted from the multiplication section 106, that is, the current value whose target current limit value is limited, is further subjected to correction by an inertia damper correction section 107 and then outputted.

On the other hand, the temperature estimated value T is inputted also to a current upper limit map 108. The current upper limit map 108 stores target current values corresponding to different values of the temperature estimated value T. As seen in the figure, the target current value is set such that it decreases as the temperature estimated value T increases. The rate of variation of the current value is different between a region in which the temperature estimated value T is low and another region in which the temperature estimated value T is high, and in the region in which the temperature estimated value T is high, the decreasing rate of the current value decreases with respect to the rate of increase of the temperature estimated value T.

A target current selection section 109 compares the current value read out from the current upper limit map 108 with the current value outputted from the inertia damper correction section 107. Then, the target current selection section 109 adopts a lower one of the current values as a target current value for the power assisting motor 82 and inputs the target current value to the current feedback controlling section 93c.

Figure 22:
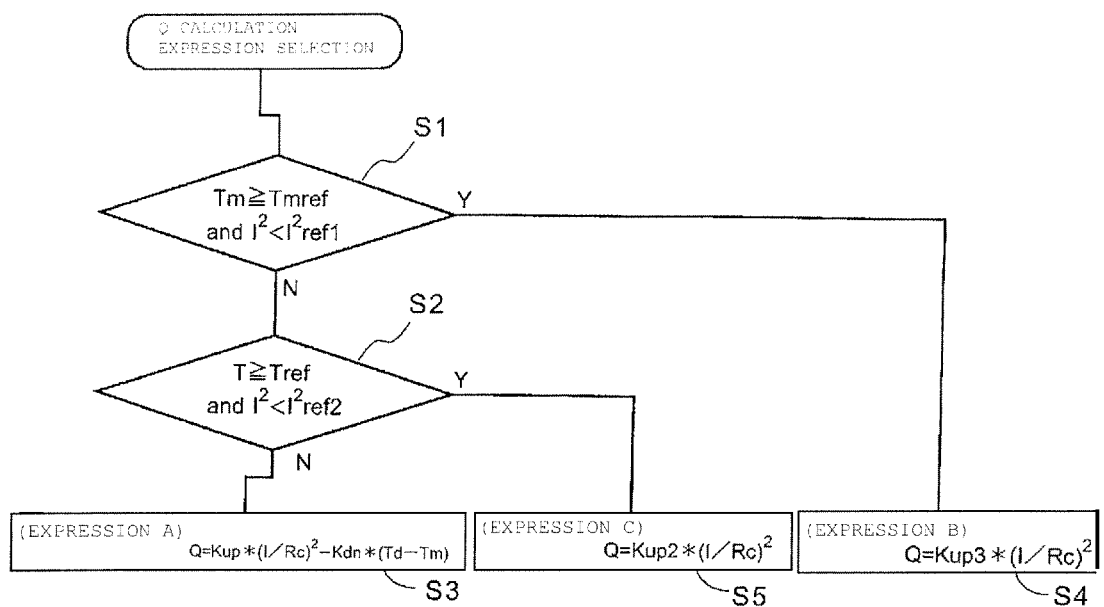
FIG. 22 is a flow chart illustrating a process of a selection section of a calculation expression used by a heat generation amount calculation section.

FIG. 22 is a flow chart illustrating processing of the selection section of a calculation expression used by the heat generation amount calculation section 101. Referring to FIG. 21, at step S1, it is decided whether or not conditions that the motor ambient temperature Tm is equal to or higher than a comparison temperature Tmref set in advance and that the square $I^2$ of the energization current I is lower than comparison current $I^2$ref1 are satisfied. If the decision at step S1 is in the negative, that is, if the motor ambient temperature Tm is lower than the comparison temperature Tmref and besides the current value $I^2$ is equal to or higher than the comparison current $I^2$ref1, then the processing advances to step S2. At step S2, it is decided whether or not the temperature estimated value T is equal to or higher than a comparison temperature Tref set in advance and besides the current value $I^2$ is lower than another comparison current $I^2$ref2. Here, the comparison current $I^2$ref1 and the comparison current $I^2$ref2 are set so as to satisfy a relationship of "comparison current $I^2$ref1<comparison current $I^2$ref2."

If the motor ambient temperature Tm and the temperature estimated value T representative of the motor temperature are within ordinary temperature ranges and also the energization current I is in an ordinary state in which it is between the comparison current $I^2$ref1 and the comparison current $I^2$ref2, then the decision at step S2 is in the negative, and the processing advances to step S3. At step S3, a calculation expression A of the heat generation amount Q is selected. The calculation expression A is such as given below.

$$Q=Kup\times(1/Rc)^2-Kdn\times(Td-Tm) \quad \text{expression A.}$$

If the decision at step S1 is in the affirmative, that is, if the motor ambient temperature Tm is equal to or higher than the comparison temperature Tmref and if the current $I^2$ is lower than the ordinary range, then the processing advances to step S4, at which a calculation expression B of the heat generation amount Q is selected. Since the heat radiation effect is low where the motor ambient temperature Tm is high, the calculation expression B eliminates the heat radiation term. Consequently, since the value of the heat generation amount Q becomes equal to or higher than the value calculated in accordance with the expression A, the ratio and the current value are limited to the low side. The calculation expression B is such as given below.

$$Q=Kup3\times(1/Rc)^2 \quad \text{expression B.}$$

On the other hand, when the decision at step S2 is in the affirmative, that is, when the motor ambient temperature Tm is equal to or lower than the comparison temperature Tmref and the temperature estimated value T is equal to or higher than the comparison temperature Tref and besides the current $I^2$ is lower than the comparison current $I^2$ref2, the processing advances to step S5 in order to prevent an equilibrium state of the current I, and at step S5, a calculation expression C of the heat generation amount Q which eliminates the heat radiation term is selected. Also with the expression C, the value of the heat generation amount Q becomes higher than the value calculated in accordance with the expression A, as is the case with expression B, and therefore, the ratio and the current value come to the lower side. The calculation expression C is such as given below.

$$Q=Kup2\times(1/Rc)^2 \quad \text{expression C.}$$

The calculation expression C can be used where the temperature of a motor peripheral part which has a heat sink or the like and has a great heat capacity, that is, the motor ambient temperature Tm, is high. In this instance, since the temperature difference from the motor is small and the heat radiation action is low, even where the current value is low, an upper limit of the heatproof temperature is reached in long time. Accordingly, the heat generation coefficient Kup3 is set to a low value.

On the other hand, the calculation expression B can be used where the motor ambient temperature Tm is low. In this instance, although the temperature difference from the motor is great, since the temperature estimated value T representative of the temperature of the motor which has a brush of a small heat capacity is high, even with low current, an upper limit of the heatproof temperature is reached in short time. Accordingly, the heat generation coefficient Kup2 is set to a high value so that the heat generation amount Q has a high value even with a low current value. As a result, the temperature estimated value T representative of the motor temperature is calculated to a rather high value so that the current limitation is applied rather early. In short, the heat generation coefficient Kup2 is set to a value higher than that of the heat generation coefficient Kup3.

It is to be noted that, while, in the embodiment of FIG. 22, the current $I^2$ is included as one of selection references for the calculation expressions A, B and C at steps S1 and S2, selection of a calculation expression may otherwise be carried out based only on the temperature estimated value T and the motor ambient temperature Tm without including the decision of the current $I^2$.

In the embodiment of FIG. 22, the current is limited with a lower one of the current value determined with a ratio calculated by the ratio map 105 and the current value calculated by the current upper limit map 108. Here, where the current is limited with the calculation value of the ratio map 105, the current limitation is possible while the temperature estimated value T does not enter an equilibrium state. However, where the current value calculated by the current upper limit map 108 is selected to limit the current, since the temperature estimated value T and the current value I enter an equilibrium state, the current cannot be limited to a value lower than the current value I with which an equilibrium state is exhibited.

In particular, if the heat generation amount Q assumes a low value as a result of the current limitation by the current upper limit map 108, then also the cumulative value Td becomes low. As the cumulative value Td becomes low, the current upper limit map 108 selects a high current upper limit value again. Consequently, the heat generation amount Q becomes higher and also the temperature estimated value T becomes higher, and the current upper limit value determined by the current upper limit map 108 becomes higher again. In this manner, the limited current varies bit by bit in the proximity of a certain current value in accordance with the temperature estimated value T, and the current I cannot be limited to a value lower than the current value.

Therefore, in a second embodiment described below, the function of the heat generation amount calculation section 101 in the apparatus shown in FIG. 22 is modified such that the current value does not enter an equilibrium state.

Figure 23:
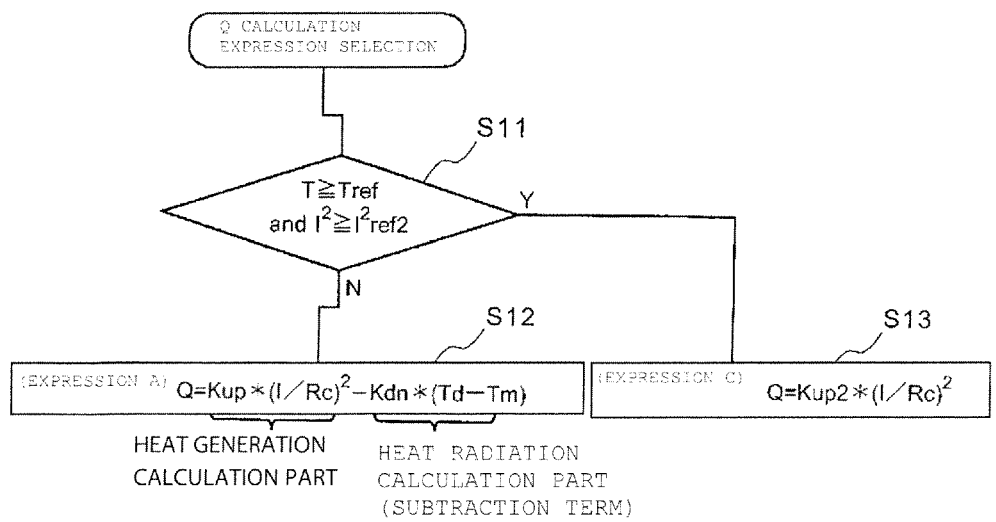
FIG. 23 is a flow chart illustrating a process of the selection section of a calculation expression used by a heat generation amount calculation section according to a second embodiment.

FIG. 23 is a flow chart illustrating processing of the selection section of a calculation expression to be used by the heat generation amount calculation section 101 according to the second embodiment. Referring to FIG. 23, at step S11, it is decided whether or not the temperature estimated value T is equal to or higher than the comparison temperature Tref and besides the current value $I^2$ is equal to or higher than comparison current $I^2\text{ref2}$. If the decision at step S11 is in the negative, that is, if the temperature estimated value T is lower than the comparison temperature Tref and the current value $I^2$ is lower than the comparison current $I^2\text{ref2}$, then the processing advances to step S12, at which the heat generation amount Q is calculated using a calculation expression including a "heat generation calculation part" and a "heat radiation calculation part (subtraction term)" same as the expression A given hereinabove.

On the other hand, if the decision at step S11 is in the affirmative, then the processing advances to step S13, at which the heat generation amount Q is calculated using the calculation expression C which is equivalent to the calculation expression A from which the subtraction term "Kdn× (Td−Tm)" is deleted. The heat generation amount Q calculated with the calculation expression C at step S13 has a value higher than that of the heat generation amount Q calculated with the calculation expression A which has the subtraction term which takes the difference from the motor ambient temperature into consideration. Therefore, where the current upper limit value is determined using the current upper limit map 108 to limit the current, if the temperature estimated value T is equal to or higher than the comparison temperature Tref, then the heat generation amount Q is calculated so as to have a rather high value. Consequently, the current upper limit value is set lower and the current I can be limited.

Figure 24A:
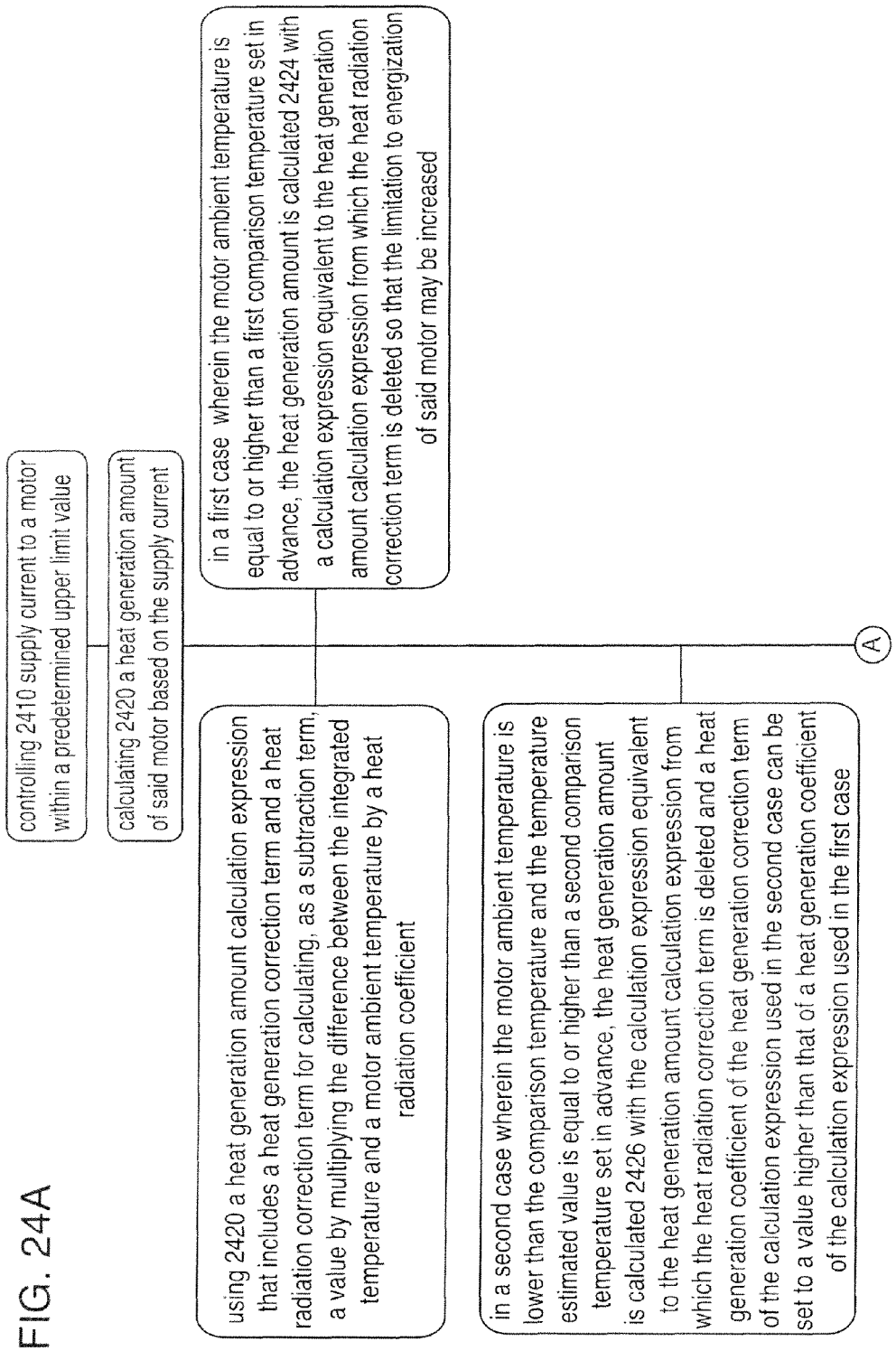
FIG. 24 illustrates a method according to certain embodiments of the present invention.
Figure 24B:
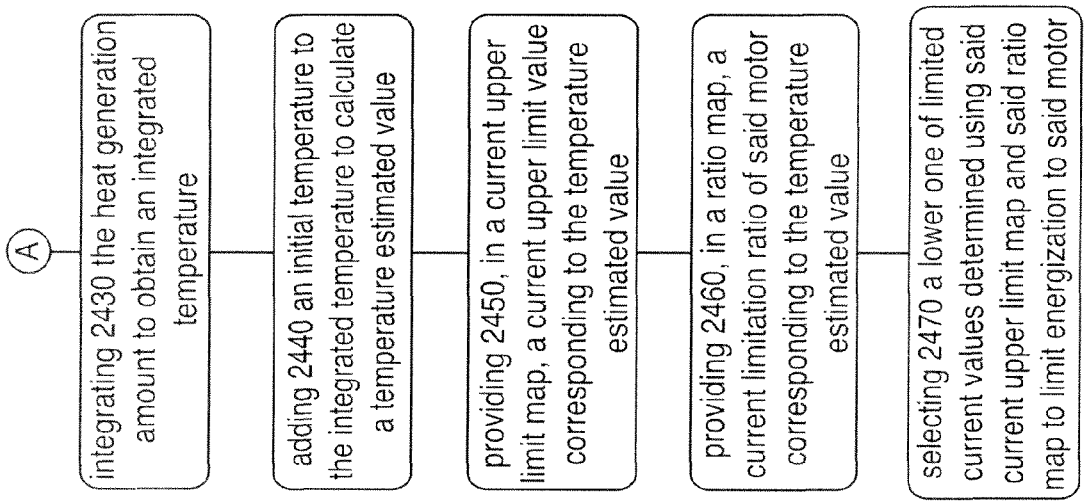

FIG. 24 illustrates a method according to certain embodiments of the present invention. The method, as illustrated, includes controlling 2410 supply current to a motor within a predetermined upper limit value. The method also includes, in this example, calculating 2420 a heat generation amount of the motor based on the supply current. In this instance, the method further includes integrating 2430 the heat generation amount to obtain an integrated temperature and adding 2440 an initial temperature to the integrated temperature to calculate a temperature estimated value.

The method can include providing 2450, in a current upper limit map, a current upper limit value corresponding to the temperature estimated value. The method can also include providing 2460, in a ratio map, a current limitation ratio of the motor corresponding to the temperature estimated value. The method can further include selecting 2470 a lower one of limited current values determined using the current upper limit map and the ratio map to limit energization to the motor.

The calculating 2420 the heat generation amount can include using 2420 a heat generation amount calculation expression that includes a heat generation correction term and a heat radiation correction term for calculating, as a subtraction term, a value by multiplying the difference between the integrated temperature and a motor ambient temperature by a heat radiation coefficient. The calculating the heat generation amount can be performed such that, in a first case wherein the motor ambient temperature is equal to or higher than a first comparison temperature set in advance, the heat generation amount is calculated 2424 with a calculation expression equivalent to the heat generation amount calculation expression from which the heat radiation correction term is deleted so that the limitation to energization of the motor may be increased.

Moreover, the calculating 2420 the heat generation amount can be performed such that, also in a second case wherein the motor ambient temperature is lower than the comparison temperature and the temperature estimated value is equal to or higher than a second comparison temperature set in advance, the heat generation amount is calculated 2426 with the calculation expression equivalent to the heat generation amount calculation expression from which the heat radiation correction term is deleted, and a heat generation coefficient of the heat generation correction term of the calculation expression used in the second case can be set to a value higher than that of a heat generation coefficient of the calculation expression used in the first case.

The preceding method can be performed in various ways. For example, the method may be performed entirely by hardware or by hardware operating in connection with software. Furthermore, the software may take the form, for example, of computer instructions encoded, or otherwise embodied, on a computer-readable medium. The computer-readable medium may be a non-transitory medium such as a storage medium. A storage medium may include, for example, memory on a chip, a hard disk drive, or a flash random access memory (RAM).

While the embodiments described above are examples wherein the present invention is applied to an electric power steering apparatus, the protection apparatus of the present invention can be applied not only to that for a power steering apparatus but also widely to systems which include means for estimating the difference between a heat generation amount and a heat radiation amount to estimate the motor temperature or the temperature of a motor controller and protects the motor or the motor controller from overheating based on the estimated temperature. Further, it is possible to estimate individual temperatures not only of the motor controller but also of peripheral apparatus of the motor and determine an estimated temperature common to them.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

REFERENCE SYMBOLS

1 . . . Vehicle
10 . . . Maximum steering switch
13 . . . First estimated temperature calculation section
14 . . . Second estimated temperature calculation section
25 . . . Steering shaft
27 . . . First target current value calculation section
28 . . . Second target current value calculation section
30 . . . Target current value selection section
43 . . . Non-limited current calculation section
46 . . . Ratio re-setting section
80 . . . Electric power steering apparatus
82 . . . Power assisting motor
91 . . . Torque sensor
92 . . . Torsion bar
93 . . . Motor control unit
93$a$ . . . Current sensor
93$b$ . . . Target current limiting section
100 . . . Multiplication section
101 . . . Heat generation amount calculation section
105 . . . Ratio map
108 . . . Current upper limit map

I claim:
1. An apparatus, comprising:
a motor controller configured to control supply current to a motor within a predetermined upper limit value;

a heat generation amount calculation section configured to calculate a heat generation amount of said motor based on the supply current;
an integration section configured to integrate the heat generation amount to obtain an integrated temperature;
an addition section configured to add an initial temperature to the integrated temperature to calculate a temperature estimated value;
a current upper limit map having a current upper limit value set therein corresponding to the temperature estimated value;
a ratio map having a current limitation ratio of said motor set therein corresponding to the temperature estimated value; and
a selection section configured to select a lower one of limited current values determined using said current upper limit map and said ratio map to limit energization to said motor,
wherein said heat generation amount calculation section is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient, and
wherein said heat generation amount calculation section is configured such that, in a first case wherein the motor ambient temperature is equal to or higher than a first comparison temperature set in advance, the heat generation amount is calculated with a calculation expression equivalent to the heat generation amount calculation expression from which the heat radiation correction term is deleted so that the limitation to energization of said motor may be increased.

2. The apparatus according to claim 1, wherein said heat generation amount calculation section is configured such that, also in a second case wherein the motor ambient temperature is lower than the comparison temperature and the temperature estimated value is equal to or higher than a second comparison temperature set in advance, the heat generation amount is calculated with the calculation expression equivalent to the heat generation amount calculation expression from which the heat radiation correction term is deleted, and
a heat generation coefficient of the heat generation correction term of the calculation expression used in the second case is set to a value higher than that of a heat generation coefficient of the calculation expression used in the first case.

3. The apparatus according to claim 1, wherein said motor is a power assisting motor for power steering for a vehicle for traveling on uneven ground.

4. An overheat protection apparatus for use with an apparatus which includes a motor, and a motor controller for controlling supply current to said motor within a predetermined upper limit value, said overheat protection apparatus comprising:
a heat generation amount calculation section configured to calculate a heat generation amount of said motor based on the supply current;
an integration section configured to integrate the heat generation amount to obtain an integrated temperature;
an addition section configured to add an initial temperature to the integrated temperature to calculate a temperature estimated value;
a current upper limit map having a current upper limit value set therein corresponding to the temperature estimated value;
a ratio map having a current limitation ratio of said motor set therein corresponding to the temperature estimated value; and
a selection section configured to select a lower one of limitation current values determined using said current upper limit map and said ratio map to limit energization of said motor; and
wherein said heat generation amount calculation section is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient, and
wherein said heat generation amount calculation section is configured such that, when the temperature estimated value is equal to or higher than a third comparison temperature set in advance, the heat generation amount is calculated with a calculation expression equivalent to the heat generation amount calculation expression from which the heat radiation correction term is deleted.

5. The overheat protection apparatus according to claim 4, wherein said motor is a power assisting motor for power steering for a vehicle for traveling on uneven ground.

6. An apparatus, comprising:
control means for controlling supply current to a motor within a predetermined upper limit value;
heat generation amount calculation means for calculating a heat generation amount of said motor based on the supply current;
integration means for integrating the heat generation amount to obtain an integrated temperature;
addition means for adding an initial temperature to the integrated temperature to calculate a temperature estimated value;
a current upper limit map having a current upper limit value set therein corresponding to the temperature estimated value;
a ratio map having a current limitation ratio of said motor set therein corresponding to the temperature estimated value; and
selection means for selecting a lower one of limited current values determined using said current upper limit map and said ratio map to limit energization to said motor,
wherein said heat generation amount calculation means is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient, and
wherein said heat generation amount calculation means is configured such that, in a first case wherein the motor ambient temperature is equal to or higher than a first comparison temperature set in advance, the heat generation amount is calculated with a calculation expression equivalent to the heat generation amount calculation expression from which the heat radiation correction term is deleted so that the limitation to energization of said motor may be increased.

7. The overheat protection apparatus according to claim 6, wherein said heat generation amount calculation means is configured such that, also in a second case wherein the motor ambient temperature is lower than the comparison temperature and the temperature estimated value is equal to or higher than a second comparison temperature set in advance, the heat generation amount is calculated with the calculation expression equivalent to the heat generation amount calculation expression from which the heat radiation correction term is deleted, and a heat generation coefficient of the heat generation correction term of the calculation expression used in the second case is set to a value higher than that of a heat generation coefficient of the calculation expression used in the first case.

8. The apparatus according to claim 6, wherein said motor is a power assisting motor for power steering for a vehicle for traveling on uneven ground.

9. An overheat protection apparatus for use with an apparatus which includes a motor, and control means for controlling supply current to said motor within a predetermined upper limit value, the overheat protection apparatus comprising:

heat generation amount calculation means for calculating a heat generation amount of said motor based on the supply current;

integration means for integrating the heat generation amount to obtain an integrated temperature;

addition means for adding an initial temperature to the integrated temperature to calculate a temperature estimated value;

a current upper limit map having a current upper limit value set therein corresponding to the temperature estimated value;

a ratio map having a current limitation ratio of said motor set therein corresponding to the temperature estimated value; and selection means for selecting a lower one of limitation current values determined using said current upper limit map and said ratio map to limit energization of said motor, wherein said heat generation amount calculation means is configured to use a heat generation amount calculation expression that includes a heat generation correction term and a heat radiation correction term for calculating, as a subtraction term, a value by multiplying the difference between the integrated temperature and a motor ambient temperature by a heat radiation coefficient, and wherein said heat generation amount calculation means is configured such that, when the temperature estimated value is equal to or higher than a third comparison temperature set in advance, the heat generation amount is calculated with a calculation expression equivalent to the heat generation amount calculation expression from which the heat radiation correction term is deleted.

10. The overheat protection apparatus according to claim 9, wherein said motor is a power assisting motor for power steering for a vehicle for traveling on uneven ground.

11. A method, comprising:

controlling supply current to a motor within a predetermined upper limit value;

calculating a heat generation amount of said motor based on the supply current;

integrating the heat generation amount to obtain an integrated temperature;

adding an initial temperature to the integrated temperature to calculate a temperature estimated value;

providing, in a current upper limit map, a current upper limit value corresponding to the temperature estimated value;

providing, in a ratio map, a current limitation ratio of said motor corresponding to the temperature estimated value; and selecting a lower one of limited current values determined using said current upper limit map and said ratio map to limit energization to said motor, wherein said calculating the heat generation amount comprises using a heat generation amount calculation expression that includes a heat generation correction term and a heat radiation correction term for calculating, as a subtraction term, a value by multiplying the difference between the integrated temperature and a motor ambient temperature by a heat radiation coefficient, and wherein said calculating the heat generation amount is performed such that, in a first case wherein the motor ambient temperature is equal to or higher than a first comparison temperature set in advance, the heat generation amount is calculated with a calculation expression equivalent to the heat generation amount calculation expression from which the heat radiation correction term is deleted so that the limitation to energization of said motor may be increased.

12. The method of claim 11, wherein said calculating the heat generation amount is performed such that, also in a second case wherein the motor ambient temperature is lower than the comparison temperature and the temperature estimated value is equal to or higher than a second comparison temperature set in advance, the heat generation amount is calculated with the calculation expression equivalent to the heat generation amount calculation expression from which the heat radiation correction term is deleted, and a heat generation coefficient of the heat generation correction term of the calculation expression used in the second case is set to a value higher than that of a heat generation coefficient of the calculation expression used in the first case.

13. A method for use with an apparatus which includes a motor, and a controller configured to control supply current to said motor within a predetermined upper limit value, the method comprising:

calculating a heat generation amount of said motor based on the supply current;

integrating the heat generation amount to obtain an integrated temperature;

adding an initial temperature to the integrated temperature to calculate a temperature estimated value;

providing, in a current upper limit map, a current upper limit value corresponding to the temperature estimated value;

providing, in a ratio map, a current limitation ratio of said motor corresponding to the temperature estimated value; and selecting a lower one of limitation current values determined using said current upper limit map and said ratio map to limit energization of said motor, wherein said calculating the heat generation amount comprises using a heat generation amount calculation expression that includes a heat generation correction term and a heat radiation correction term for calculating, as a subtraction term, a value by multiplying the difference between the integrated temperature and a motor ambient temperature by a heat radiation coefficient, and wherein said calculating the heat generation amount is performed such that, when the temperature estimated value is equal to or higher than a third comparison temperature set in advance, the heat generation amount is calculated with a calculation expression equivalent to the heat generation amount calculation expression from which the heat radiation correction term is deleted.

* * * * *